United States Patent [19]
Sato

[11] Patent Number: 6,070,021
[45] Date of Patent: May 30, 2000

[54] CONTROLLER FOR CONTROLLING STOPPAGE-TIMING OF APPLICATION OF VOLTAGE TO ELECTRO-DEVELOPING RECORDING MEDIUM

[75] Inventor: Koichi Sato, Tokyo, Japan

[73] Assignee: Asahi Kogaku Kogyo Kabushiki Kaisha, Tokyo, Japan

[21] Appl. No.: 08/933,363

[22] Filed: Sep. 18, 1997

[30] Foreign Application Priority Data

Sep. 19, 1996 [JP] Japan .................................. 8-269437
Mar. 14, 1997 [JP] Japan .................................. 9-081840

[51] Int. Cl.[7] .......................... G03B 17/48; G03B 29/00; G03B 17/50; G03B 7/099
[52] U.S. Cl. .............................. 396/429; 396/30; 396/276
[58] Field of Search ............................. 396/30, 429, 273, 396/276

[56] References Cited

U.S. PATENT DOCUMENTS

| | | | |
|---|---|---|---|
| 5,115,261 | 5/1992 | Noda et al. | 354/62 |
| 5,408,341 | 4/1995 | Takanashi et al. | 358/471 |
| 5,424,156 | 6/1995 | Aoki et al. . | |
| 5,444,509 | 8/1995 | Ohishi | 354/202 |
| 5,514,504 | 5/1996 | Iijima et al. . | |
| 5,555,205 | 9/1996 | Okabe | 365/108 |
| 5,631,705 | 5/1997 | Tani . | |
| 5,646,927 | 7/1997 | Shimizu et al. | 369/99 |

FOREIGN PATENT DOCUMENTS

| | | |
|---|---|---|
| 0622954 | 11/1994 | European Pat. Off. . |
| 5-2280 | 1/1993 | Japan . |
| 5165005 | 6/1993 | Japan . |
| 6130347 | 5/1994 | Japan . |
| 6313894 | 11/1994 | Japan . |
| 7-13132 | 1/1995 | Japan . |
| 7-72505 | 3/1995 | Japan . |

OTHER PUBLICATIONS

English Language Translation of Japanese Unexamined Patent Publication No. 7–13132.
English Language Translation of Japanese Unexamined Patent Publication No. 6–313894.
English Language Translation of Japanese Unexamined Patent Publication No. 7–72505.

*Primary Examiner*—David M. Gray
*Assistant Examiner*—Christopher Mahoney
*Attorney, Agent, or Firm*—Greenblum & Bernstein, P.L.C.

[57] ABSTRACT

A controller controls a termination time of an application of a voltage to an electro-developing recording medium such that an image can be recorded and developed with optimum contrast. The controller has a power source for applying a voltage to the medium, a transparency sensor for detecting a transparency of the medium, and a differentiator for differentiating a value of the detected transparency. The controller also has a comparator, a determiner, and a stopper. The comparator compares the differentiated value with a predetermined threshold level. The determiner determines whether or not the differentiated value is greater than or equal to the predetermined threshold level. The stopper stops the application of the voltage to the medium when the determiner determines the differentiated value is greater than or equal to the predetermined threshold level.

34 Claims, 17 Drawing Sheets

CONTROLLER FOR CONTROLLING STOPPAGE-TIMING OF APPLICATION OF VOLTAGE TO ELECTRO-DEVELOPING RECORDING MEDIUM

BACKGROUND OF THE INVENTION

1. Field of the Invention

The present invention relates to a controller for controlling a stoppage-timing of an application of a voltage to an electro-developing recording medium, such that an image can be recorded and developed with an optimum contrast.

2. Description of the Related Art

Such an electro-developing recording medium per se is known. For example, Japanese Unexamined Patent Publications No. 5-2280 and No. 7-13132, and U.S. Pat. No. 5,424,156 disclose one type of electro-developing recording medium, and a still camera using the electro-developing recording medium is known as an electro-developing type still video camera.

The electro-developing recording medium comprises an electrostatic information recording medium and an electric charge keeping medium combined to face each other with a small gap therebetween. The electrostatic information recording medium is frequently called an optical sensor, and includes a photoconducting layer and an inorganic oxide material layer, whereas the electric charge keeping medium includes a liquid crystal display.

In the electro-developing type still video camera using the electro-developing recording medium, when a photographing operation is carried out, a voltage is applied to the electro-developing recording medium, and an optical image is focussed on a light receiving surface of the electrostatic information recording medium through a photographing lens system. An electric charge is produced and distributed over the electrostatic information recording medium in accordance with a light intensity distribution of the optical image formed on the light receiving surface thereof, so that the intensity of an electric field, acting on the liquid crystal of the electric charge keeping medium, is in accordance with the electric charge distribution.

Thus, a distribution of the transmittance of the liquid crystal of the electric charge keeping medium is varied in accordance with the electric-field-intensity distribution, so that the optical image is reproduced in the electric charge keeping medium as a visible image. Namely, as soon as the optical image is formed on the electrostatic information recording medium, the optical image is recorded and developed in the electric charge keeping medium.

Japanese Unexamined Patent Publication No. 5-165005 discloses another type of electro-developing recording medium. In this type of medium, a structure of the electrostatic information recording medium is substantially the same as that of the electrostatic information recording medium disclosed previously, except that the inorganic oxide material layer is omitted therefrom, and the electric charge keeping medium or liquid crystal display is constituted as a liquid-crystal-polymer composite (LCPC). The LCPC uses using a memory type of liquid crystal, such as smectic liquid crystal. Similar to the first-mentioned type of electro-developing recording medium, both the electrostatic information recording medium and the electric charge keeping medium are combined to face each other with a small gap therebetween.

Furthermore, Japanese Unexamined Patent Publications No. 6-130347 and No. 7-13132 disclose yet another type of electro-developing recording medium. In this type of medium, the inorganic oxide material layer is also omitted from the electrostatic information recording medium, and the electric charge keeping medium or liquid crystal display is also constituted as the liquid-crystal-polymer composite (LCPC) using the memory type of liquid crystal. Nevertheless, both the electrostatic information recording medium and the electric charge keeping medium are integrally combined with each other, interposed with a transparent insulating layer. No gaps exist therebetween.

All things considered, when the electric charge keeping medium is constituted as a memory-type liquid crystal display, using, for example, a smectic liquid crystal, the developed visible image can be kept therein even if the electric field is eliminated from the electro-developing recording medium. Thus, the electro-developing recording medium carrying the developed visible image can be preserved in the same way as slides or transparency sheet films. Also, in the memory type liquid crystal display, the developed image can be erased by heating the display to a given temperature. In this case, the same electro-developing recording medium can be repeatedly used for photographing.

When an optical image is recorded and developed in the electro-developing recording medium, the developed image should be obtained with an optimum contrast. A contrast of the developed image is closely related to a time during which the voltage is applied to the electro-developing recording medium. Namely, a stoppage-timing of the application of a voltage must be properly controlled before the optimum contrast of the developed image can be ensured.

Even when the electro-developing recording medium is not exposed to light, a transparency gradually increases due to the application of a voltage to the electro-developing recording medium. By utilizing this characteristic of the electro-developing recording medium, it is possible to control the stoppage-timing of the application of voltage, as disclosed in Japanese Unexamined Patent Publication No. 7-72505.

In particular, a light-blocking element is adhered to a part of a margin area of the light receiving surface of the electrostatic information recording medium, such that the part is defined as a dark zone. Also, a light-reflecting element is adhered to a surface of the photoconducting layer so as to be aligned with the dark zone formed by the light-blocking element. During the photographing operation, a transmittance of the dark zone is detected. When a value of the detected transmittance exceeds a predetermined threshold, the application of the voltage to the electro-developing recording medium is stopped.

Nevertheless, this conventional stoppage-timing control is unreliable because the electro-developing recording medium exhibits an inherent transparency-characteristic, i.e. electro-developing recording mediums have individual transparency-characteristics.

SUMMARY OF THE INVENTION

Therefore, an object of the present invention is to provide a controller for controlling a stoppage-timing of an application of a voltage to an electro-developing recording medium, such that an image can be recorded and developed with an optimum contrast, even if there are differing transparency-characteristics among electro-developing recording mediums.

In accordance with a first aspect of the present invention, there is provided a controller for controlling a time of an application of a voltage to an electro-developing recording medium so as to develop an image therein with an optimum contrast. The controller comprises a power source, a transparency sensor, a differentiator, and a determiner. The power source is applying the voltage to the electro-developing recording medium. The transparency sensor is for detecting a transmittance of the electro-developing recording medium. The differentiator is for differentiating a value of the transmittance detected by the transparency sensor. The determiner is for determining the time of the application of the voltage to the electro-developing recording medium on the basis of the differentiated value obtained by the differentiator.

The above-mentioned differentiated value may be a primary-differentiated value. In this case, the determination of the time of the application of the voltage to the electro-developing recording medium is carried out by the determiner on the basis of a comparison of the primary-differentiated value with a predetermined threshold level.

Also, the above-mentioned differentiated value may be a secondary-differentiated value. In this case, the determination of the time of the application of the voltage to the electro-developing recording medium is carried out by the determiner on the basis of a comparison of the secondary-differentiated value with a predetermined threshold level. Alternatively, the determination of the time of the application of the voltage to the electro-developing recording medium is carried out by the determiner on the basis of a detection of a first peak of the secondary-differentiated value.

Further, the above-mentioned differentiated value may be a tertiary-differentiated value. In this case, the determination of the time of the application of the voltage to the electro-developing recording medium is carried out by the determiner on the basis of a comparison of the tertiary-differentiated value with a predetermined threshold level.

Preferably, the transparency sensor detects a transmittance of a dark zone defined in the electro-developing recording medium.

In accordance with a second aspect of the present invention, there is provided a controller for controlling a stoppage-timing of an application of a voltage to an electro-developing recording medium to develop an image with an optimum contrast. The controller comprises a power source, a transparency sensor, a differentiator, a comparator, a determiner, and a stopper. The power source is for applying a voltage to the recording medium. The transparency sensor is for detecting a transmittance of the recording medium. The differentiator is for differentiating a value of the transmittance detected by the transparency sensor. The comparator is for comparing the differentiated value, obtained by the differentiator, with a predetermined threshold level. The determiner is for determining whether or not the differentiated value is greater than or equal to the predetermined threshold level. The stopper is for stopping the application of a voltage to the recording medium when it is determined by the determiner that the differentiated value is greater than or equal to the predetermined threshold level.

The stopper may comprise a switch circuit for switching the power source ON and OFF. The determiner may comprise a flip-flop for controlling a switching operation of the switch circuit on the basis of a comparing-result from the comparator. Alternatively, the determiner may comprise a program for controlling a switching operation of the switch circuit on the basis of a comparing-result from the comparator.

In accordance with a third aspect of the present invention, there is provided a controller for controlling a stoppage-timing of an application of a voltage to an electro-developing recording medium to develop an image with an optimum contrast. The controller comprises a power source, a transparency sensor, a primary and secondary differentiator, a detector, a determiner and a stopper. The power source is for applying a voltage to the recording medium. The transparency sensor is for detecting a transmittance of the recording medium. The primary differentiator is for differentiating a value of the transmittance detected by the transparency sensor. The secondary differentiator is for differentiating the primary-differentiated value obtained by the primary differentiator. The detector is for detecting a first peak of the secondary differentiated value obtained by the secondary differentiator. The determiner is for determining whether or not the first peak of the secondary-differentiated value is detected by the detector. The stopper is for stopping the application of a voltage to the recording medium when the determiner determines that the first peak of the secondary-differentiated value has been detected.

Preferably, the stopper comprises a switch circuit for switching the power source ON and OFF. The determiner comprises a program for controlling a switching operation of the switch circuit on the basis from a detecting-result of the detector.

In accordance with a fourth aspect of the present invention, there is provided a controller for controlling a stoppage-timing of an application of voltage to an electro-developing recording medium to develop an image with an optimum contrast. The controller comprises a power source, a transparency sensor, a primary, secondary and tertiary differentiator, a compactor, a determiner, and a stopper. The power source is for apply a voltage to the recording medium. The transparency sensor is for detecting a transmittance of the recording medium. The primary differentiator is for differentiating a value of the transmittance detected by the transparency sensor. The secondary differentiator is for differentiating the primary-differentiated value obtained by the primary differentiator. The tertiary differentiator is for differentiating the secondary-differentiated value obtained by the secondary differentiator. The comparator is for comparing the tertiary-differentiated value, obtained by the tertiary differentiator, with a predetermined threshold level. The determiner is for determining whether or not the differentiated value is less than or equal to the predetermined threshold level. The stopper is for stopping the application of a voltage to the recording medium when the determiner determines that the differentiated value is less than or equal to the predetermined threshold level.

In the fourth aspect of the present invention, the stopper may comprise a switch circuit for switching the power source ON and OFF. The determiner may comprise a flip-flop for controlling a switching operation of the switch circuit on the basis from a comparing-result of the comparator. Alternatively, the stopper may comprise a switch circuit for switching the power source ON and OFF, and the determiner comprises a program for controlling a switching operation of the switch circuit on the basis from a comparing-result of the comparator.

BRIEF DESCRIPTION OF THE DRAWINGS

The objects and other objects of the present invention will be better understood from the following description, with reference to the accompanying drawings in which.

DESCRIPTION OF THE PREFERRED EMBODIMENTS

Figure 1:
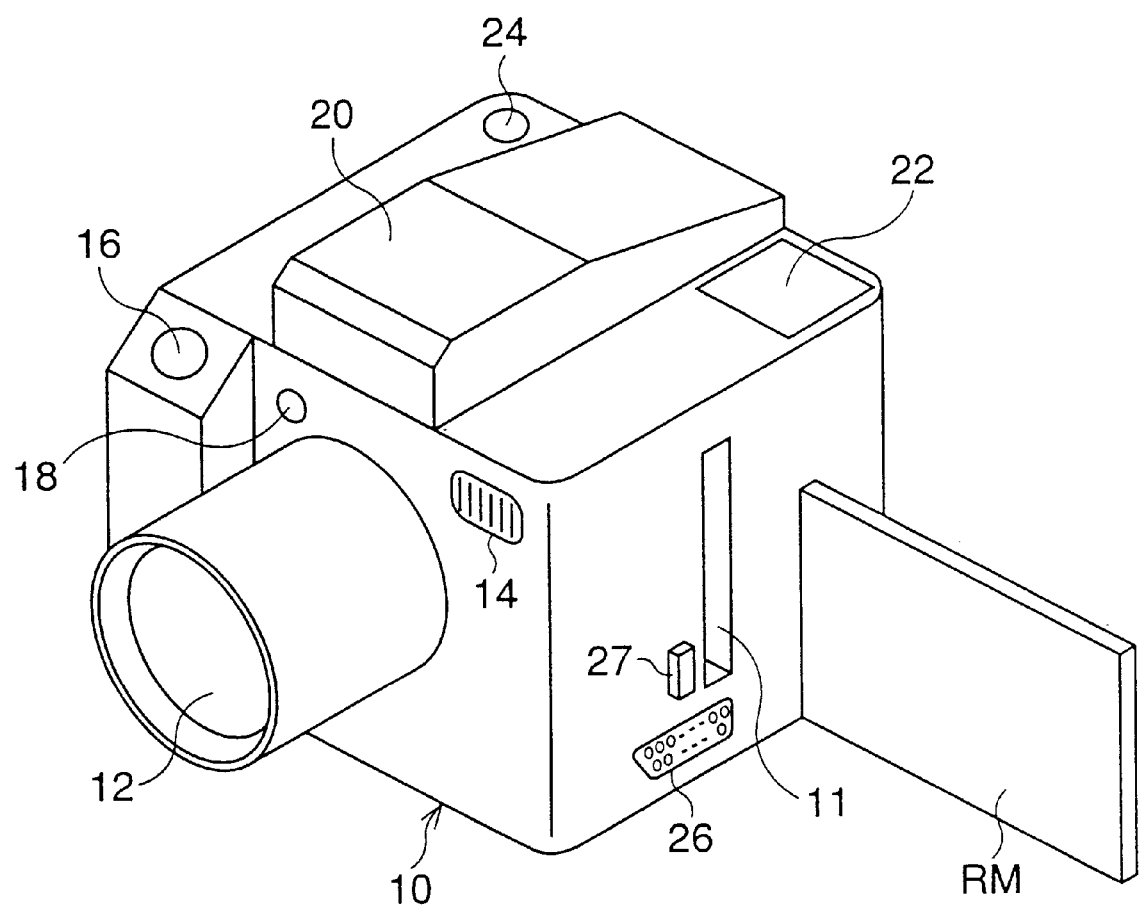
FIG. 1 is a perspective view showing an electro-developing type still video camera in which a controller according to the present invention is embodied.

FIG. 1 is an external view of an electro-developing type still video camera in which the present invention is embodied. The camera comprises a camera body 10 having an elongated slot 11 formed in a side wall. An electro-developing recording medium RM is loaded and unloaded, with respect to the camera, through the elongated slot 11.

When viewing the camera body 10 from a front side, a photographing lens system 12 is provided at an approximately central location on a front surface of the camera body 10, and an electronic flash 14 is disposed on the front surface of the camera body 10 above and to the right side of the lens system 12. A release switch 16 and a photometry sensor 18 are provided on the front surface of the camera body 10, above and to the left of the photographing lens system 12.

A view finder 20 is provided centrally on the top surface of the body 10. An LCD (liquid crystal display) panel 22 is provided on the top surface, to one side of the view finder 20, and a main switch 24 is provided on the other side of the view finder 20. Further, an output terminal connector 26 is provided in the side wall of the body 10, in which the elongated slot 11 is formed, so that an image signal obtained by the camera can be output to an external recording device. Note, in FIG. 1, reference numeral 27 indicates an ejection button for unloading the electro-developing recording medium from the camera through the elongated slot 11.

Figure 2:
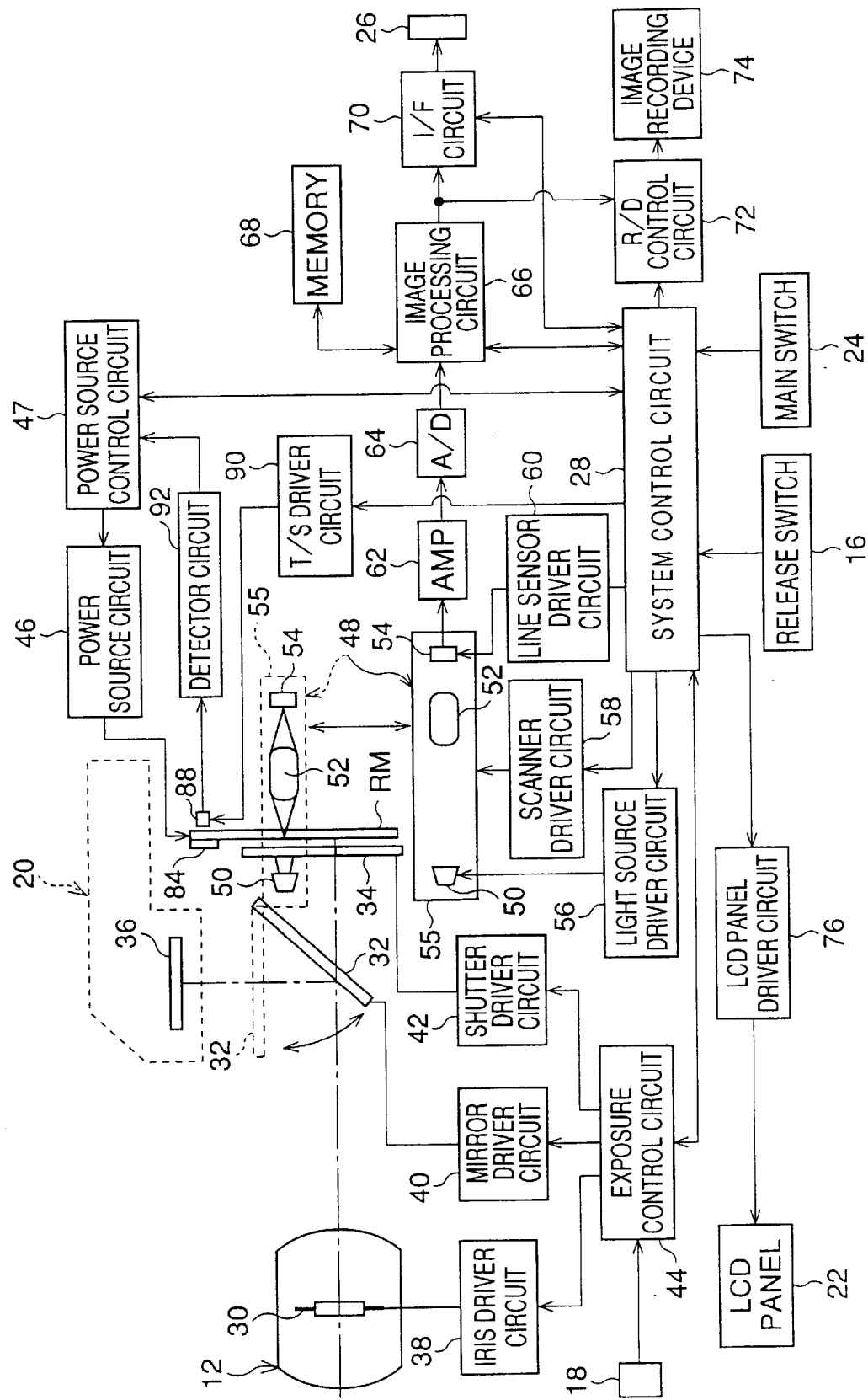
FIG. 2 is a block diagram of the electro-developing type still video camera shown in FIG. 1.

FIG. 2 shows a block diagram of the electro-developing type still video camera as shown in FIG. 1. A system control circuit 28, which includes a microcomputer or microprocessor, a read-only memory (ROM), and a random-access-memory (RAM), etc., is provided to control the camera as a whole.

The photographing lens system 12 has a plurality of lens groups and an aperture or diaphragm 30 incorporated therein, and the medium RM loaded through the elongated slot 11 is disposed behind the lens system 12. A quick return mirror 32 is placed between the lens system 12 and the medium RM, and a shutter 34 is provided between the quick return mirror 32 and the medium RM. A focusing glass 36, included in a view finder optical system of the view finder 20, is disposed above the quick return mirror 32.

The diaphragm 30, the mirror 32 and the shutter 34 are driven by an iris driver circuit 38, a mirror driver circuit 40, and a shutter driver circuit 42, respectively. The driver circuits 38, 40, and 42 are controlled by an exposure control circuit 44 which is operated in accordance with a command signal output by the system control circuit 28.

While an exposure is controlled, an aperture size of the diaphragm 30 is adjusted by the iris driver circuit 38 under control of the exposure control circuit 44 based on an output signal of the photometry sensor 18.

The quick return mirror 32 is usually in a down-position (the inclined position shown by the solid lines in FIG. 2), and thus the light beams passing through the lens system 12 are directed to the optical system of the viewfinder 20 so that an object to be photographed can be observed through the viewfinder 20 by a photographer. Upon executing a photographing operation, the quick return mirror 32 is rotated upward by the mirror driver circuit 40, and is then in an up-position (the horizontal position shown by the broken lines in FIG. 2), so that the light beams are directed to the shutter 34.

The shutter 34 is usually closed, however, when taking a photograph, the shutter 34 is opened for a given period of time by the shutter driver circuit 42 under control of the exposure control circuit 44. Thus, during the photographing operation, the light beams, passing through the lens system 12 and the shutter 34, are directed to a light receiving surface of the medium RM. Namely, by rotating the quick return mirror 42 from the down position to the up-position, and by opening the shutter 34, an optical image to be photographed by the lens system 12 is focussed on the light receiving surface of the medium RM.

A voltage is applied to the medium RM from a power source circuit 46, and the application of the voltage to the medium RM is controlled by a power source control circuit 47 which is operated by the system control circuit 28.

A light-reflective element 84 is adhered to a part of a margin area of the light receiving surface of the medium RM, such that the part is defined as a dark zone. A transparency sensor 88 is disposed to be aligned with the dark zone, i.e. the light-reflective element 84. The sensor 88 is operated by a transparency-sensor driver circuit 90 under control of the system control circuit 28, and detects a transmittance of the dark zone of the medium RM.

Note, the light-reflective element 84 may comprise a piece of suitable metal foil, such as aluminum foil, a suitable coating exhibiting reflectivity, or the like.

The transparency sensor 88 includes a light emitting device, such as a light emitting diode (LED), and a light receiving device associated therewith, arranged such that a light beam emitted from the light emitting device is reflected by the light-reflective element 84, and is then received by the light receiving device. Thus, an output signal obtained from the light receiving device of the sensor 88 carries transmittance information concerning the dark zone, formed by the light-reflective element 84, in the medium RM. Namely, the transparency sensor 88 detects the transmittance of the dark zone. The transmittance is not affected by a photographing light, but only by an application of a voltage to the medium RM. Strictly speaking, although a transparency of the dark zone is slightly affected by the light emitted from the light emitting device of the sensor 88, the effect can be ignored because the light emitted from the light emitting device is sufficiently small in comparison with the photographing light.

The output signal output from the light receiving device of the transparency sensor 88 is input to an output-detector circuit 92, in which the output signal is processed in a manner as mentioned hereinafter. An output terminal of the output-detector circuit 92 is connected to the power source control circuit 47. Namely, the power source control circuit 47 is operated on the basis of an output signal output from the output-detector circuit 92 and a command signal output by the system control circuit 28.

By exposing the medium RM while applying the voltage, the optical image obtained by the lens system 12 is developed in the medium RM as a visible image.

An image scanner 48 is provided in the camera body 10 in the vicinity of the medium RM loaded therein, and executes a scanning operation for electronically reading the developed image of the medium RM. The image scanner 48 comprises a linear light source 50, a scanner optical system 52, and a line image sensor 54, which are supported by a carriage member 55 to be aligned with each other along the optical axis of the light source 50.

The light source 50 is positioned at the front side of both the shutter 34 and the medium RM, and includes an LED (light emitting diode) array having a plurality of light emitting diodes aligned with each other, and a collimating lens for converting the light rays emitted therefrom into parallel light rays. These elements are arranged to form a linear light emitting surface. The scanner optical system 52 and the line sensor 54 are positioned behind the medium RM. The line sensor 54 is constructed as a one-dimensional CCD sensor having, for example, 2,000 pixel elements which form a linear light receiving surface. The parallel light rays, emitted from the linear light source 50, are focussed on the linear light receiving surface of the line sensor 54 by the scanner optical system 52.

The carriage member 55, which supports the linear light source 50, the scanner optical system 52, and the line sensor 54, is movable by a drive motor (not shown), such as a stepping motor, a servo motor, or the like, between a lower position (shown by a solid line in FIG. 2) and an upper position (shown by a broken line in FIG. 2).

When the scanning operation or reading operation of the developed image is executed, the shutter 34 is opened, and the linear light source 50 is turned ON. Then, the carriage member 55 is moved from the lower position (solid lines) to a scanning start position, and is further moved intermittently from the scanning start position toward the upper position (broken lines). Thus, the medium RM is scanned with the light rays emitted from the light source 50 during the intermittent movement of the image scanner 48.

During the scanning operation, the light rays passing through the medium RM, i.e. the light rays carrying image information of the developed image are focussed on the light receiving surface of the line sensor 54 by the scanner optical system 52. The line sensor 54 serves as a photoelectric-conversion device for sensing and converting the image information into electrical pixel signals. Of course, the light source 50 and the line sensor 54 are of suitable length to completely cover and extended over a width of a recording area of the medium RM. The electrical pixel signals are read out from the line sensor 54 during movement of the image scanner 48 between two adjacent scanning steps.

ON and OFF control of the light source 50 is performed by a light source driver circuit 56. The intermittent movement of the scanning mechanism 48 is carried out by driving the drive motor for the carriage member 55 under control of a scanner driver circuit 58. The reading-out of the pixel signals from the line sensor 54 is controlled by a line sensor driver circuit 60. These drive circuits 56, 58, and 60 are controlled by the system control circuit 28.

The pixel signals sensed by and read out from the line sensor 54 are amplified by an amplifier 62, and are then converted to digital pixel signals by an analog-to-digital (A/D) converter 64. The digital pixel signals are subjected to a shading correction, a gamma correction, and so on by an image processing circuit 66 under control of the system control circuit 28. They are then temporarily stored in a memory 68, which may include an EEPROM having correction data for the shading correction. Note, the memory 68 may have a capacity for storing a single-line of digital pixel signals output from the line senor 54 or it may have a capacity for storing a single-frame of digital pixel signals obtained by a completion of the scanning operation of the image scanner 48.

The pixel signals output from the memory 68 may be optionally input into an interface circuit 70, through the image processing circuit 66. In this case, the pixel signals are subjected to a given process, such as a format-conversion process and so on, and are then transferred from the interface circuit 70 to, for example, an external monitor device (not shown) through the output terminal connector 26.

Also, the pixel signals output from the image process circuit 66 may be recorded on, for example, a second recording medium, such as an IC memory card, a floppy disk, a detachable hard disk, or the like, in an image recording device 74. The pixel signals read out of the second recording medium may then be transferred to an external processing device, such as a personal computer, if necessary.

In this case, the pixel signals are subjected to predetermined processes, such as an image-compression, a format-conversion and so on, in a recording device control circuit 72.

The interface circuit 70 and the recording device control circuit 72 are operated in accordance with command signals output from the system control circuit 28.

The release switch 16 is connected to the system control circuit 28, and the photographing operation is executed in the manner as mentioned above by turning the switches ON. Also, the LCD panel 22, used for displaying various setting conditions of the camera, suitable messages, and so on, is connected to the system control circuit 28, via a liquid crystal driver circuit 76. Further, the main switch 24 is connected to the system control circuit 28 to control ON and OFF settings of a main power source (not shown).

Figure 3:
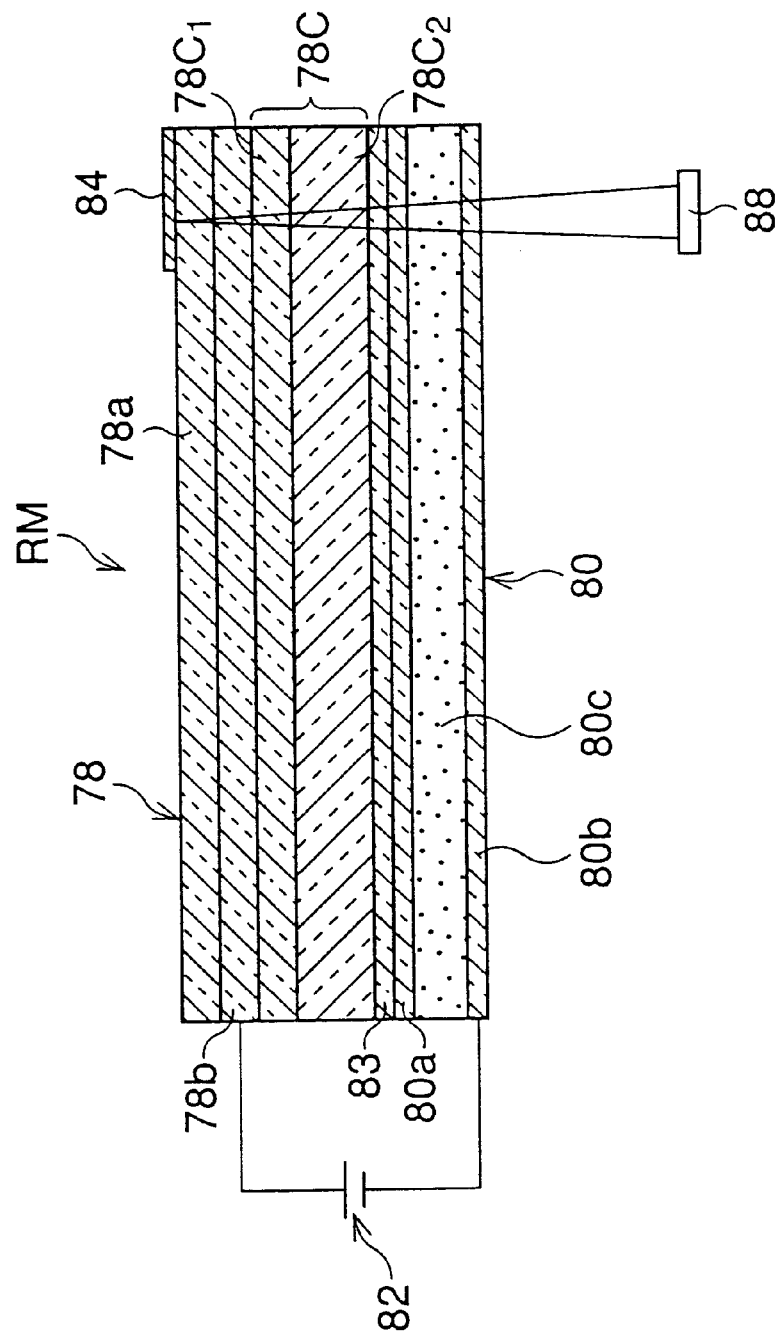
FIG. 3 is a cross sectional view showing a structure of the electro-developing recording medium used in the electro-developing type still video camera.

FIG. 3 shows a structure of one type of the medium RM which can be used in the camera. The medium RM comprises an electrostatic information recording medium 78 and an electric charge keeping medium 80. A voltage is applied therebetween by an electric power source 82, illustrated symbolically in FIG. 3. Note, the electric power source 82 does not form a part of the medium RM, but it corresponds to the power source circuit 46 shown in FIG. 2.

The information recording medium 78 is formed by laminating a base plate 78a, an electrode layer 78b, and a photoconducting layer 78C. The photoconducting layer 78c is formed by laminating an electric charge generating layer $78C_1$ and an electric charge transferring layer $78C_2$. The charge keeping medium 80 is constituted as a liquid crystal display which includes a liquid crystal supporting plate 80a, a liquid crystal electrode layer 80b, and a liquid crystal 80c interposed therebetween. Namely, the liquid crystal 80c is confined as a film-like layer between the supporting plate 80a and the electrode layer 80b.

In the example of the medium RM shown in FIG. 3, the photoconducting layer 78C and the electric charge keeping medium 80 are integrally combined with each other, interposed with a transparent insulating layer 83, without any gaps therebetween. Note, as is apparent from FIG. 3, the whole structure of the information recording medium 78 is transparent.

In photographing, a voltage is applied from the power source 82 to the medium RM, i.e. between the electrode layer 78b of the information recording medium 78 and the liquid crystal electrode layer 80b of the charge keeping medium 80. When an optical image is formed on the information recording medium 78 by the lens system 12, during the application of the voltage from the power source 82, an electric charge distribution is produced. The distribution is produced over the information recording medium 78 in accordance with a light intensity distribution of the optical image formed thereon, so that the intensity of an electric field, acting on the liquid crystal 80c of the charge keeping medium 80, is in accordance with the electric charge distribution.

Thus, the optical image obtained from the lens system 12 is reproduced in the liquid crystal 80c as a visible image. Namely, as soon as the image is formed on the information recording medium 78, the image is developed in the charge keeping medium 80.

As already stated above, when the liquid crystal 80c is of a memory-type, such as smectic liquid crystal, the developed image can be kept in the medium RM even if the electric field is eliminated therefrom. Also, preferably the liquid crystal display 80 is constituted as a liquid-crystal-polymer composite (LCPC), as disclosed in the above-mentioned publication (5-165005). In particular, the LCPC includes a polymer film having a plurality of fine spherical polymer elements dispersed over a surface thereof. The polymer film is combined with the liquid crystal electrode 80b, such that the polymer elements are interposed therebetween, so that the smectic liquid crystal is encapsulated in the space therebetween. Thus, once an optical image is developed in the medium RM, the developed image can be kept in the medium RM even if the electric field is eliminated therefrom.

Of course, before the developed image can be obtained with an optimum contrast, a contrast adjustment should be properly carried out. In the medium RM as mentioned above, the contrast control is closely related to a time during which a voltage is applied to the medium RM, as discussed below.

Figure 4:
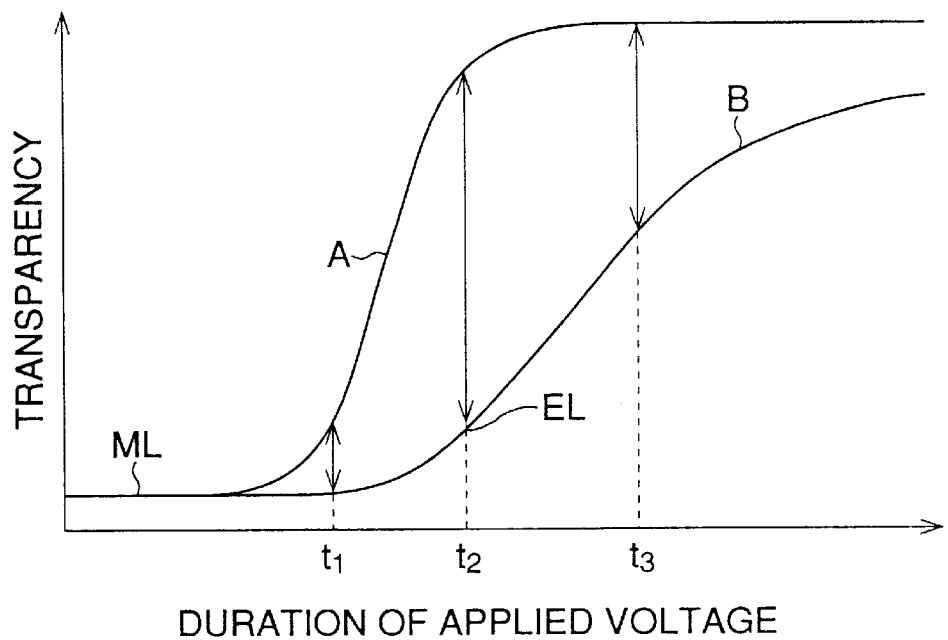
FIG. 4 is a graph showing characteristic curves of transmittances at light and dark zone images, respectively, of the electro-developing recording medium shown in FIG. 3.

For example, if a chart image having white zones and black zones is formed on the information recording medium 78 of the medium RM, while the white and black zones of the chart image are developed as light areas of the image and dark areas of the image in the charge keeping medium or liquid crystal display 80 thereof, respectively, the transparencies of the light areas of the image and the dark areas of the image vary in accordance with a duration of the applied voltage to the medium RM, as shown in a graph of FIG. 4.

Namely, in this graph, a curve A represents a change in the transparency of the light areas of the chart image, and a curve B represents a change in the transparency of the dark areas of the chart image. As is apparent from the graph, the curve A abruptly rises. The gradual rise occurs whereas the curve B gradually rises, because electrical resistances of local portions of the information recording medium 78, corresponding to the dark areas of the chart image, are not infinite. Thus, electrical current can flow in those local portions to cause a gradual increase in transmittance at the dark areas of the chart image.

In short, an amount of electrical current flowing in the local portions of the information recording medium 78 corresponding to the light areas of the chart image, is larger than that flowing in the other local portions of the information recording medium 78, corresponding to the dark areas of an image. Thus, the electrical charge produced at the light areas of the chart image increases more rapidly in comparison with the electrical charge at the dark areas of the chart image. Thus, as shown in the graph of FIG. 4, the change in the transparency of the light areas of an image (curve A) is more abrupt than the change in the transparency of the dark areas of an image (curve B).

A difference between the transparencies of the light and dark areas of the chart image represents a contrast of the image developed in the liquid crystal display 80 of the medium RM. As is apparent from the graph of FIG. 4, the application of a voltage to the medium RM should be stopped at a point when the time is $t_2$ so that the image can be developed with a maximum or optimum contrast. If the application of a voltage to the medium RM is prematurely stopped, for example, at a point when the time is $t_1$, the contrast of the developed image is very small compared to $t_2$. On the other hand, when the application of voltage to the medium RM is stopped too late, as indicated by $t_3$, the contrast of the developed image is smaller than at if the voltage is stopped $t_2$.

In short, an optical image, obtained from the lens system 12, can be developed in the medium RM with maximum or optimum contrast by stopping the application of a voltage to the medium RM at the point when the curve B rises from the minimum level "ML" to a level "EL" ($t_2$). In other words, a transparency level, represented by the curve B, must be detected in order to ensure the development of the optical image in the medium RM with a maximum or optimum contrast.

To this end, as mentioned above, the light-reflective element 84 is adhered to a part of the margin area of the light receiving surface of the medium RM such that the part is defined as the dark zone, and the transparency sensor 88 is disposed to be aligned with the light-reflective element 84, as best shown in FIG. 3.

Thus, during a photographing operation, if the application of a voltage to the medium RM is stopped at the point when a transmittance level detected by the transparency sensor 88 reaches a level corresponding to the transmittance level indicated by the reference "EL", in the graph of FIG. 4, the developed image must exhibit the maximum or optimum contrast. Nevertheless, this approach is unadvisable, because the optimum transmittance level, indicated by the reference "EL", is not necessarily constant among electro-developing recording mediums (RM), even if these mediums (RM) are manufactured under the same process conditions. This is because, with respect to the mediums (RM), the individual liquid crystal electrodes (80*b*) exhibit different reflective characteristics, and the individual photoconducting layers (78C) exhibit different transparency-characteristics. Thus, the transparency-characteristics of the dark zones of the respective mediums (RM) are different from each other.

Figure 5:
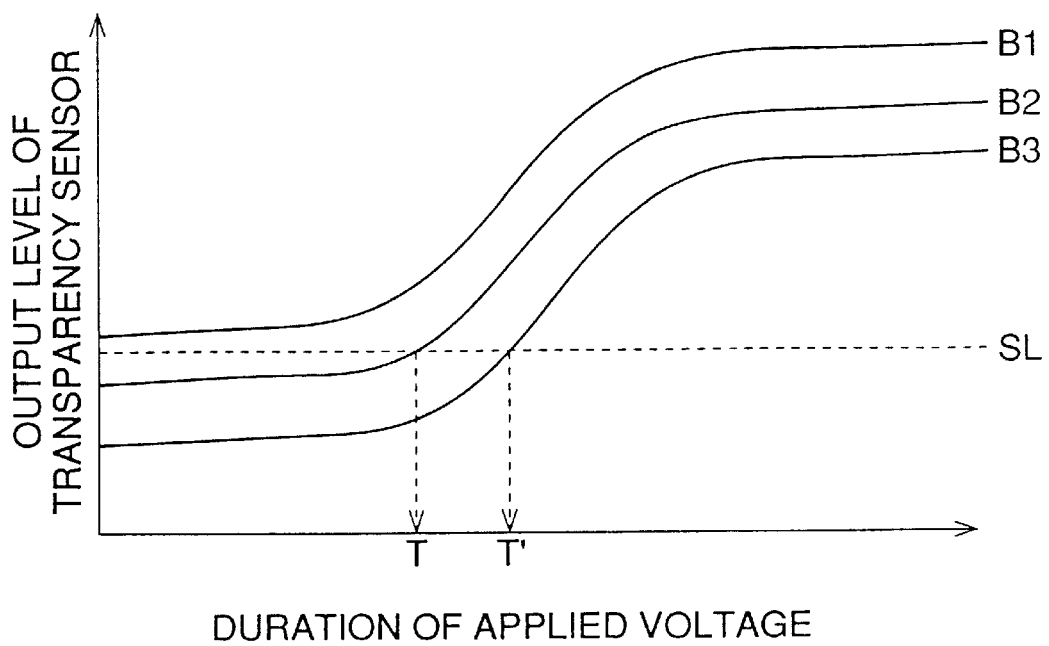
FIG. 5 is a graph in which three respective curves represent different transparency-characteristics at dark zones of three individual mediums manufactured under the same conditions.

FIG. 5 is a graph in which three respective curves B1, B2 and B3 represent differing transparency-characteristics of dark zones of three individual mediums (RM) manufactured under the same conditions. As is apparent from this graph, although the respective output levels of the transparency sensor 88, which are represented by the three curves B1, B2 and B3, are different from each other, the profiles of these curves B1, B2 and B3 are analogous to each other. Accordingly, if the application of a voltage to each medium (RM) is stopped at a time T, an optical image can be developed in each medium (RM) with maximum or optimum contrast.

Nevertheless, a common threshold cannot be set to determine the time of point T, where the application of a voltage to each medium (RM) should be stopped. For example, when a level SL is set as the common threshold, the application of a voltage to the medium (RM) exhibiting the curve B2 can be properly stopped, resulting in obtaining a developed image with the maximum or optimum contrast. However, a stoppage of the application of a voltage to the medium (RM) exhibiting the curve B3 is produced at a time of point T', later than the time of point T, resulting in the deterioration of an ideal contrast for a developed image. On the other hand, a stoppage of the application of a voltage to the medium (RM) exhibiting the curve B1 is uncontrollable because the minimum level of the curve B1 is higher than the level SL.

Figure 6:
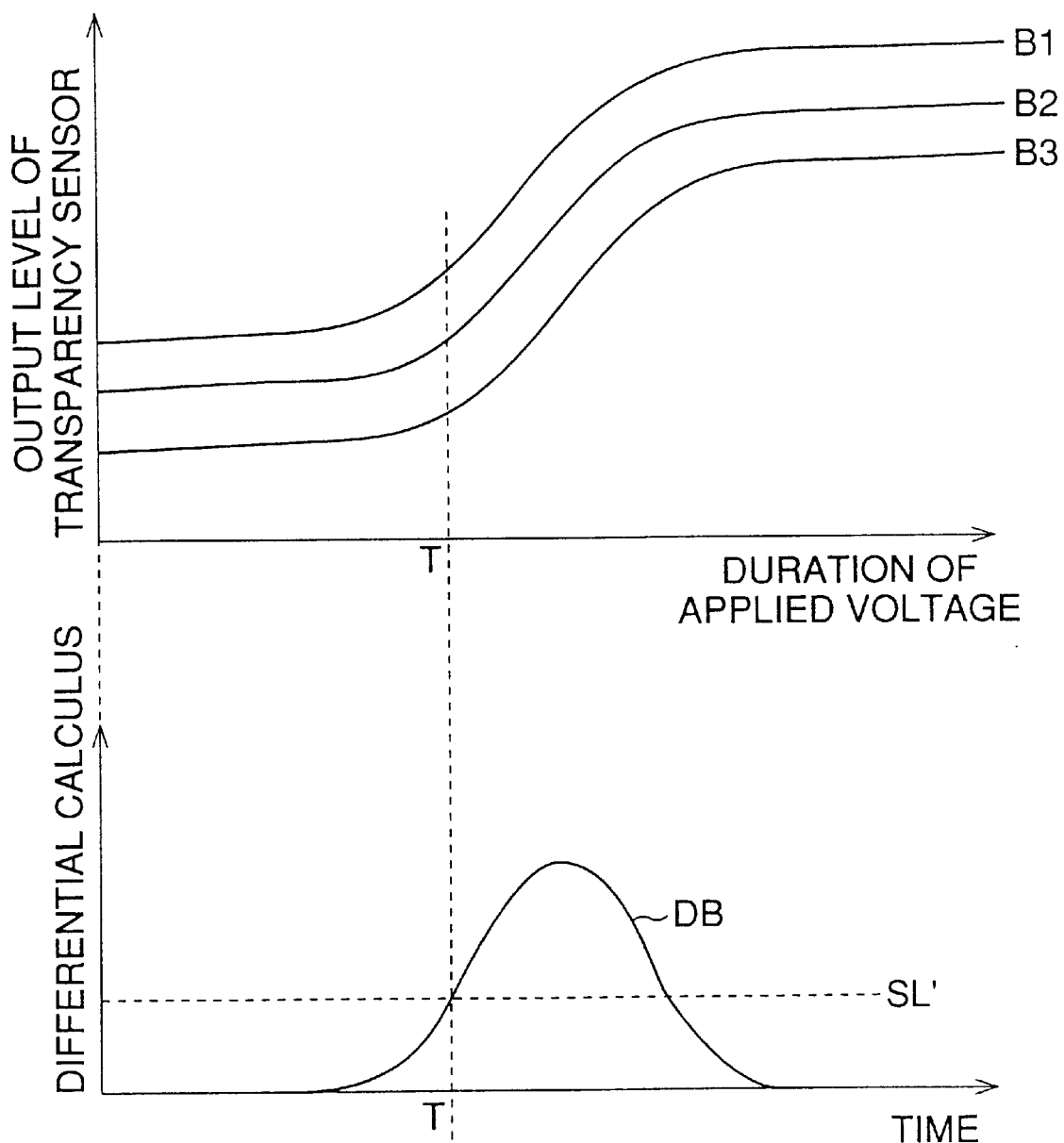
FIGS. 6A and 6B are graphs showing the three curves of FIG. 5 together with a differentiated curve derived therefrom.

It has been found that the time T can be properly determined by observing the analogy of the profiles of the curves B , B2 and B3. to Namely, when the curves B1, B2 and B3 are differentiated, the resulting curves must substantially coincide with each other due to the similarity of the profiles of the curves B1, B2 and B3, as shown in a graph of FIGS. 6A and 6B are. In this graph, the differentiated curves, which are derived from the differential calculus applied to the curves B1, B2 and B3, are represented by a curve indicated by reference "DB". As is apparent from FIG. 6, the time T can be properly determined with respect to the curves B1, B2 and B3 by setting a suitable level SL' as a threshold to the curve DB.

Figure 7:
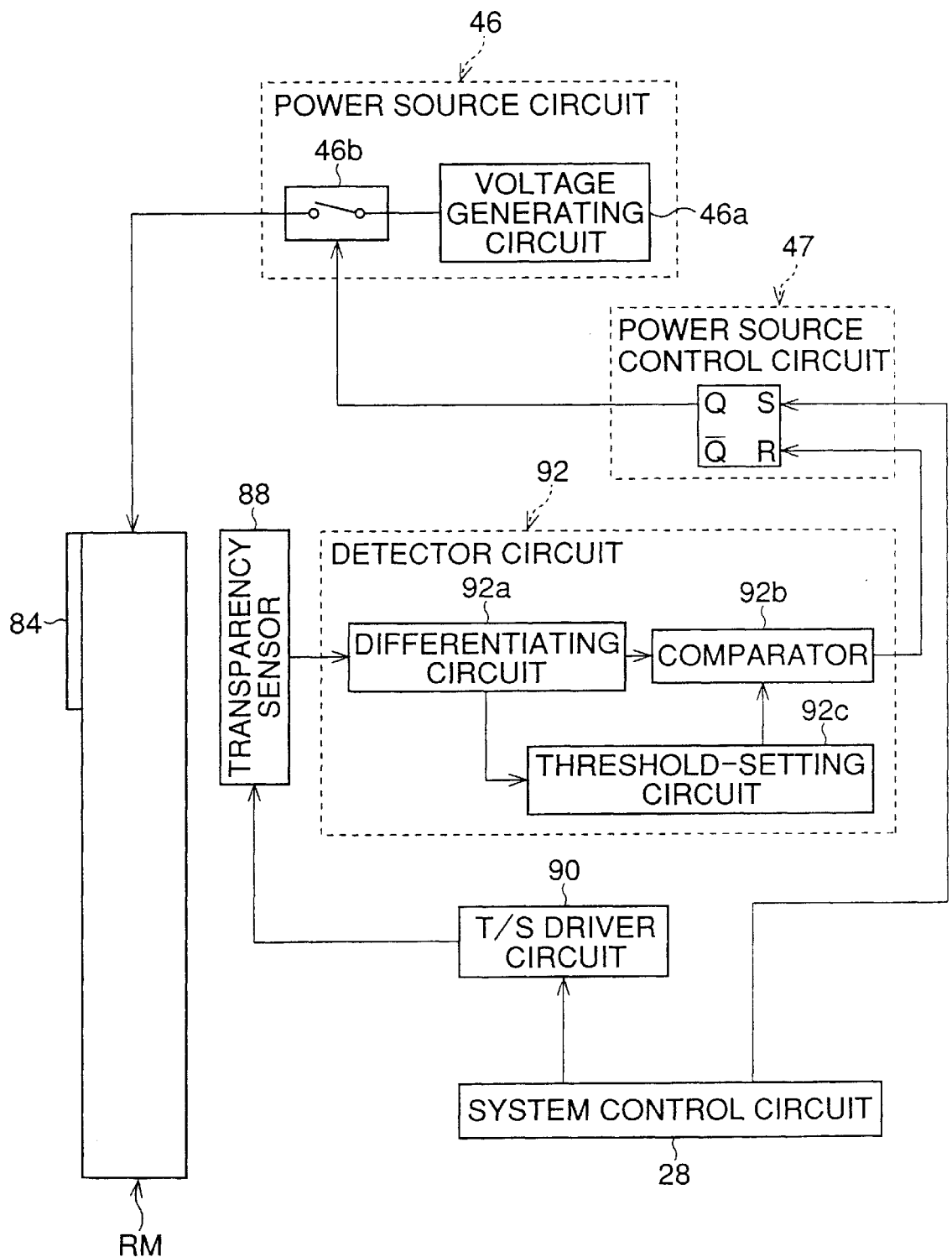
FIG. 7 is a block diagram of a first embodiment of the controller, according to the present invention, for controlling a stoppage-timing of the application of a voltage to the electro-developing recording medium.

FIG. 7 shows a block diagram of a first embodiment of the controller, according to the present invention, for controlling a stoppage-timing of the application of a voltage to the medium RM.

Figure 8:
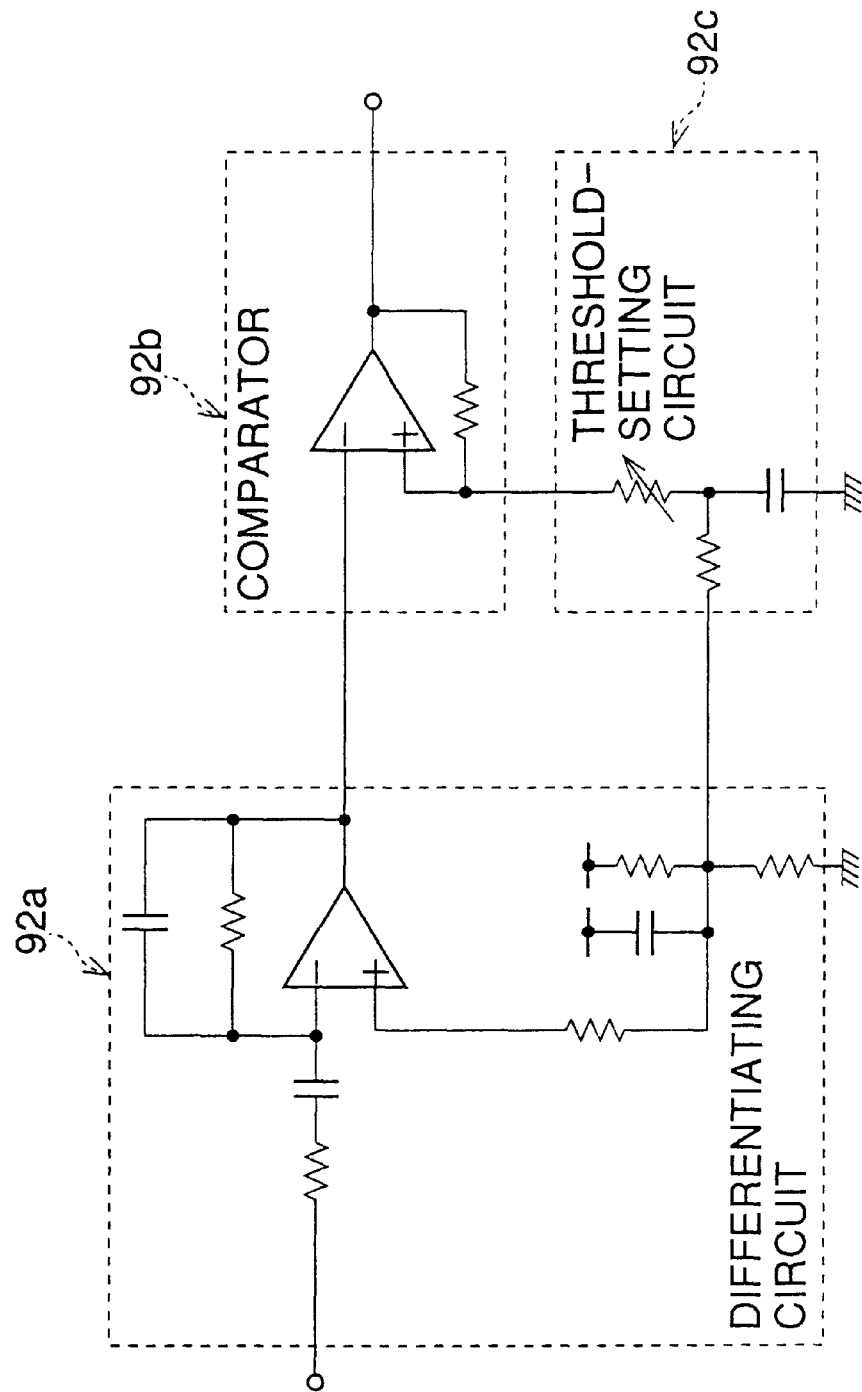
FIG. 8 is a circuit diagram of a detector circuit included in the block diagram of FIG. 7.

In the first embodiment of the present invention, the detector circuit 92 comprises a differentiating circuit 92*a*, a comparator 92*b* and a threshold-setting circuit 92*c*. Note, in FIG. 8, a circuit diagram of the detector circuit 92 is illustrated. A transparency signal (B1, B2, or B3), which is output from the transparency sensor 88, is input to and differentiated in the differentiating circuit 92*a*. Then, the differentiated signal (DB), which is output from the differentiating circuit 92*a*, is input to the comparator 92*b*, in which the differentiated signal (DB) is compared with a threshold level (SL') previously set by the threshold-setting circuit 92*c*. Note, the threshold level (SL') is variable by adjusting a variable resistance of the threshold-setting circuit 92*c* (FIG. 8).

When a level of the differentiated signal (DB) is less than the threshold level (SL'), a signal, output from the comparator 92*b*, is kept at a low level. When the level of the differentiated signal (DB) exceeds the threshold level (SL'), the level of the output signal of the comparator 92*b* is changed from the low level to a high level.

As shown in FIG. 7, the power source control circuit 47 comprises an R-S flip-flop, and the power source circuit 46 comprises a voltage generating circuit 46*a* and a switch circuit 46*b*. The set-terminal S and the reset-terminal R of the flip-flop are connected to the system control circuit 28 and the output terminal of the comparator 92*c*, respectively. The switch circuit 46*b* of the power source circuit 46 is connected to the output-terminal Q of the flip-flop. When an output level of the output terminal Q of the flip-flop is a low level, the switch circuit 46*b* is turned OFF. When the output level of the output terminal Q of the flip-flop is changed from the low level to a high level, the switch circuit 46*b* is turned ON. Consequently, a voltage is applied from the voltage-generating circuit 46*a* to the medium RM.

With reference to a timing chart shown in FIG. 9, an operation of the first embodiment of the controller according to the present invention will be explained below.

When a photographing operation is executed by turning the release switch 16, the aperture size of the diaphragm 30 is adjusted by the iris driver circuit 38 under control of the exposure control circuit 44 based on an output signal of the photometry sensor 18. Then, the quick return mirror 32 is moved from the down-position to the up-position.

Figure 9:
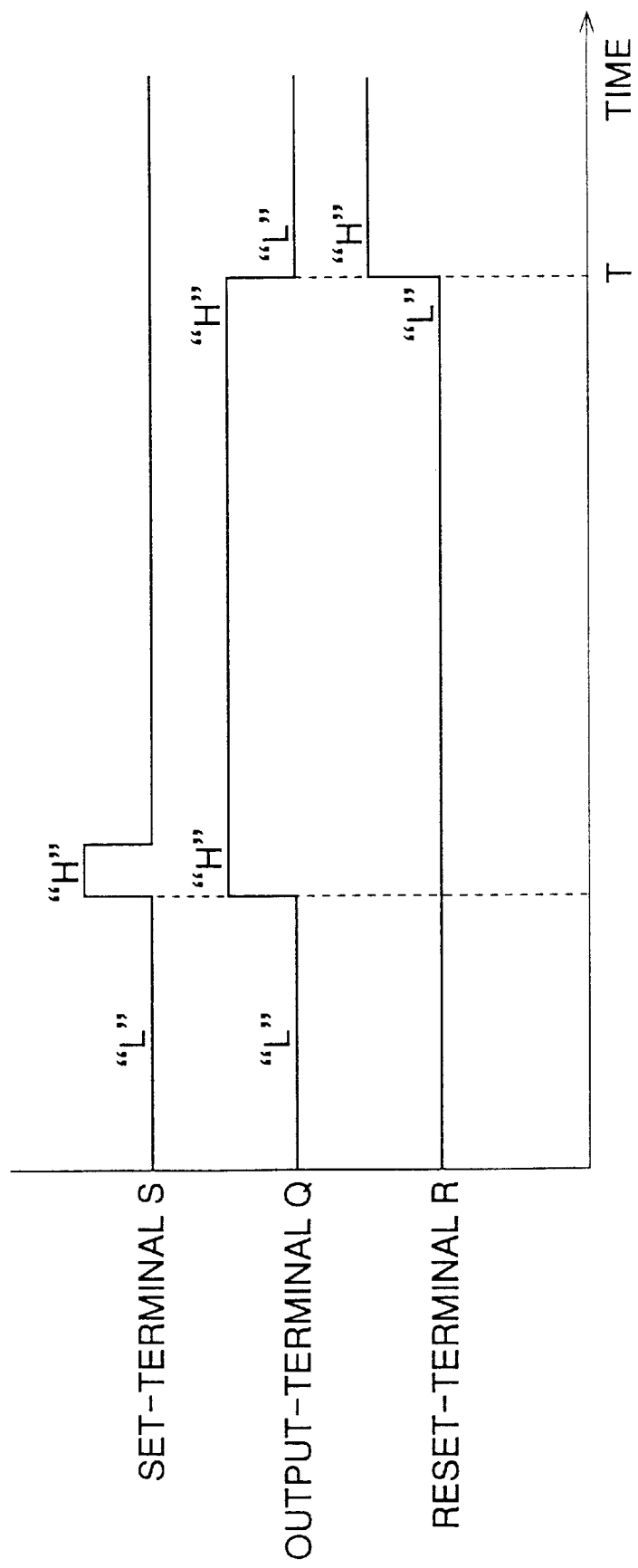
FIG. 9 is a timing chart for explaining an operation of the first embodiment of the controller according to the present invention.

When a predetermined time has elapsed from the turn-ON of the release switch 16, a level of a signal, output from the system control circuit 28 to the set-terminal S of the flip-flop (47), is changed from a low level to a high level, as shown in FIG. 9. Thus, the level of the signal output from the output-terminal Q of the flip-flop (47) to the switch circuit 46*b* is changed from the low level to the high level. Thus, the switch circuit 46*b* is turned ON so that the voltage is applied from the voltage-generating circuit 46*a* to the medium RM.

On the other hand, the transparency sensor 88 is electrically energized by the driver circuit 90, and a transparency signal output from the sensor 88 is input to and differentiated in the differentiating circuit 92*a*. The differentiated signal is then input to the comparator 92*b*, and is compared with the threshold level SL'. As mentioned above, while the level of the differentiated signal is less than the threshold level SL', the level of the output signal of the comparator 92b is kept at the low level.

When the level of the differentiated signal exceeds the threshold level SL', the level of the output signal output from the comparator 92b to the reset-terminal R of the flip-flop (47) is changed from the low level to the high level. Thus, the level of the signal, output from the output-terminal Q of the flip-flop (47) to the switch circuit 46b, is changed from the high level to the low level. Thus, the switch circuit 46b is turned OFF so that the application of a voltage from the voltage-generating circuit 46a to the medium RM is stopped. As is apparent from FIGS. 6A and 6B, the stoppage-timing of the application of a voltage to the medium RM is optimal.

Figure 10:
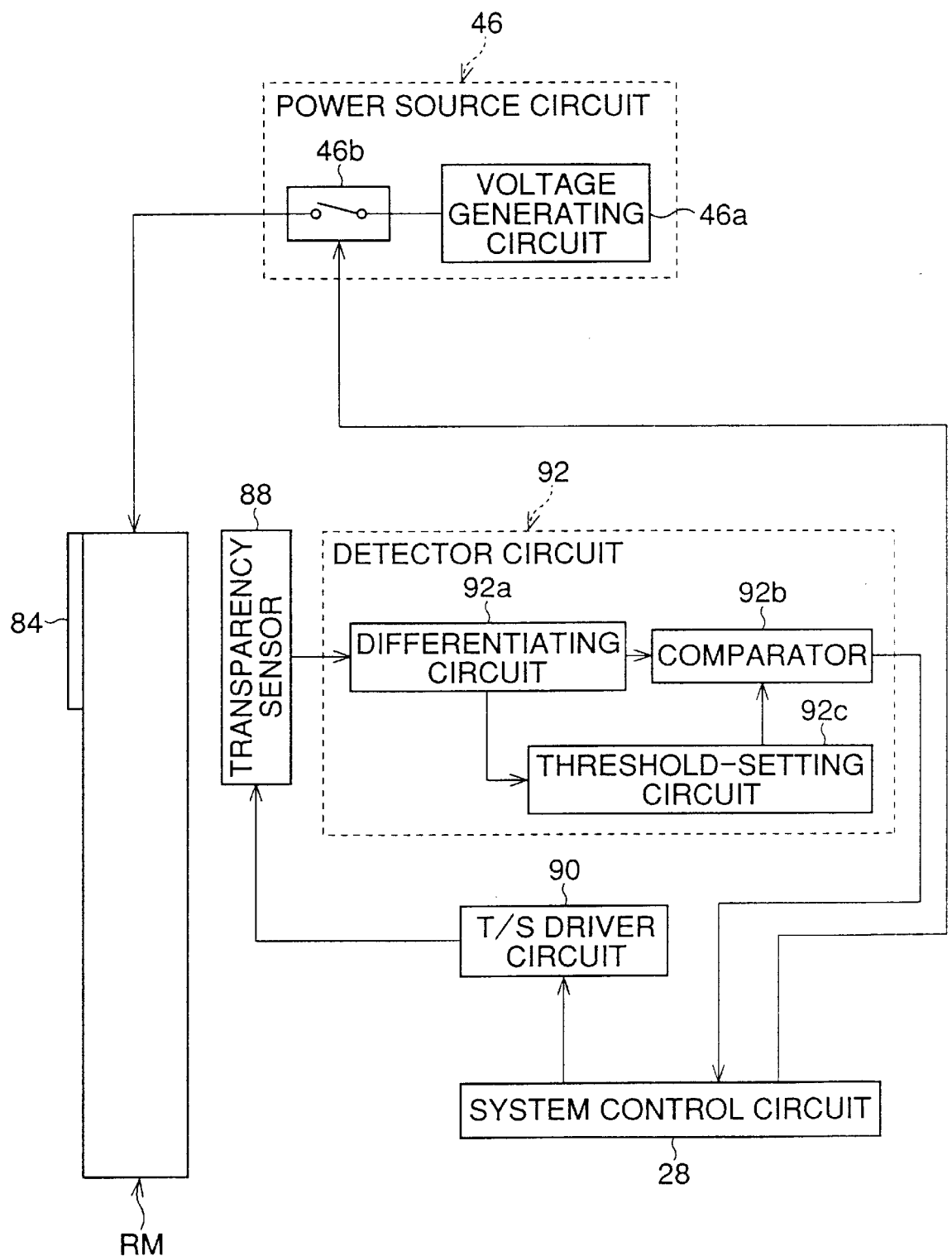
FIG. 10 is a block diagram of a second embodiment of the controller, according to the present invention, for controlling a stoppage-timing of the application of a voltage to the electro-developing recording medium.

FIG. 10 shows a block diagram of a second embodiment of the controller, according to the present invention, for controlling a stoppage-timing of the application of a voltage to the medium RM. Note, in this drawing, the features similar to those of FIG. 7 are indicated by the same references.

In the second embodiment, the power source control circuit 47, as shown in FIG. 7, is omitted. The output terminal of the comparator 92b is connected to the system control circuit 28, and the switch circuit 46b is directly connected to the system control circuit 28.

Figure 11:
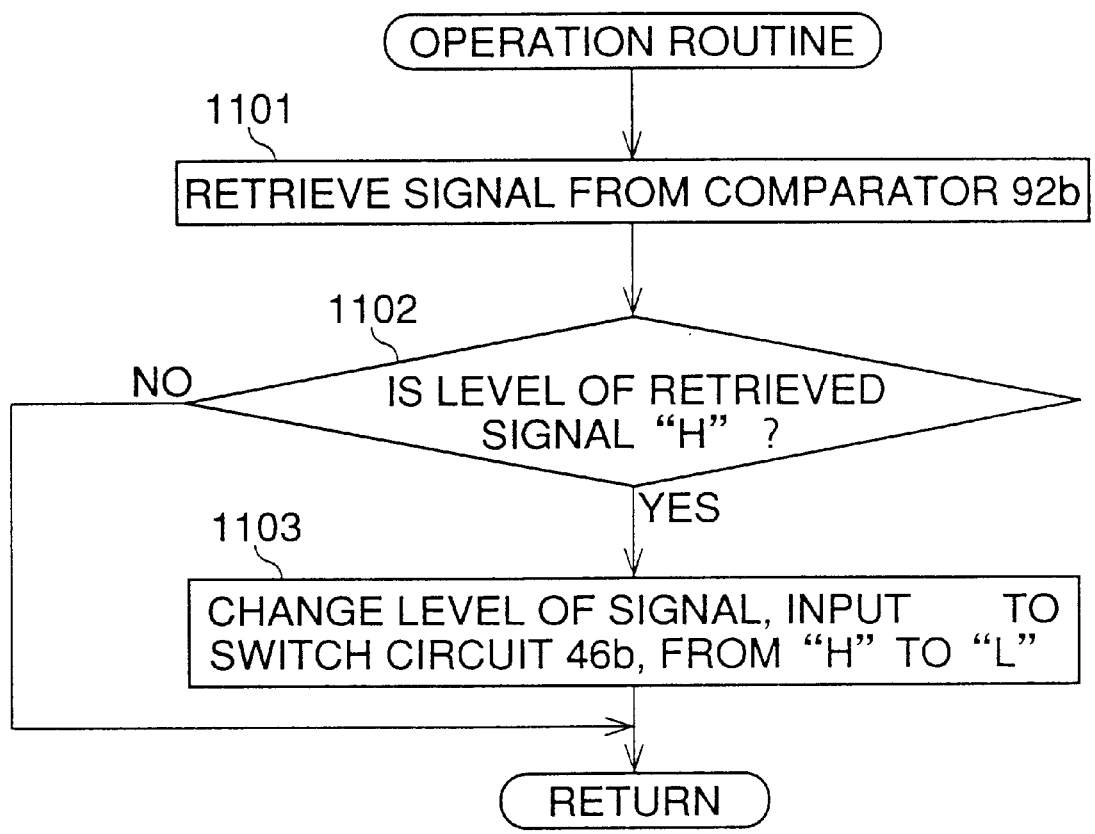
FIG. 11 is a flowchart showing an operation routine of the second embodiment of the controller according to the present invention.

FIG. 11 shows a flowchart for an operation routine of the second embodiment of the controller according to this invention. This operation routine is a time interruption routine executed at time-intervals of, for example, 1 ms. For example, the execution of the operation routine is commenced when the transparency sensor 88 is electrically energized by the driver circuit 90. At this time, the switch circuit 46b has already been turned ON by changing the level of the signal output from the system control circuit 28 to the switch circuit 46b from the low level (L) to the high level (H), so that the voltage is applied from the voltage-generating circuit 46a to the medium RM through the switch circuit 46b.

At step 1101, an output signal of the comparator 92b is retrieved by the system control circuit 28. Then, at step 1102, it is determined whether a level of the retrieved signal is the high level (H) or the low level (L). If the level of the retrieved signal is the low level, the routine is initially ended.

Thereafter, the routine is repeatedly executed at time-intervals of 1 ms. However, there is no progress as long as the level of the retrieved signal is kept at the low level. Namely, at step 1102, it is monitored whether or not the level of the retrieved signal has been changed from the low level to the high level.

When the change of the level of the retrieved signal from the low level to the high level is confirmed, the control proceeds from step 1102 to step 1103, in which the level of the signal output from the system control circuit 28 to the switch circuit 46 is changed from the high level to the low level. Thus, the switch circuit 46b is turned OFF so that the application of a voltage from the voltage-generating circuit 46a to the medium RM is stopped.

Figure 12:
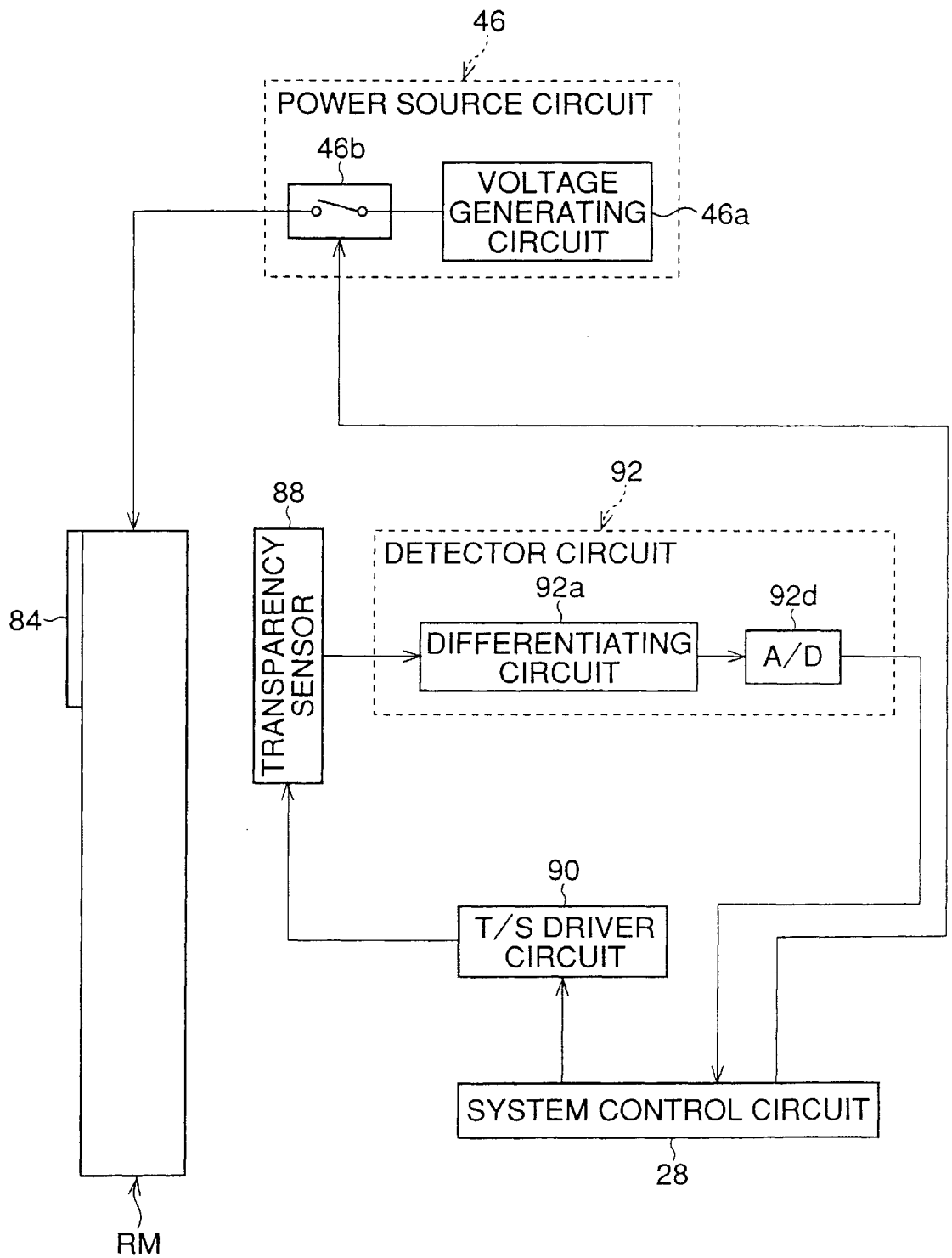
FIG. 12 is a block diagram of a third embodiment of the controller, according to the present invention, for controlling a stoppage-timing of the application of a voltage to the electro-developing recording medium.

FIG. 12 shows a block diagram of a third embodiment of the controller, according to the present invention, for controlling a stoppage-timing of the application of a voltage to the medium RM. Note, in this drawing, the features similar to those of FIG. 7 are indicated by the same references.

In the third embodiment, the power source control circuit 47, as shown in FIG. 7, is omitted. Further, the comparator 92b and the threshold-setting circuit 92c, as shown in FIG. 7, are omitted from the detector circuit 92. Thus output terminal of the differentiating circuit 92a is connected to the system control circuit 28 through the intermediary of an analog-to-digital (A/D) converter 92d. The switch circuit 46b is directly connected to the system control circuit 28.

Figure 13:
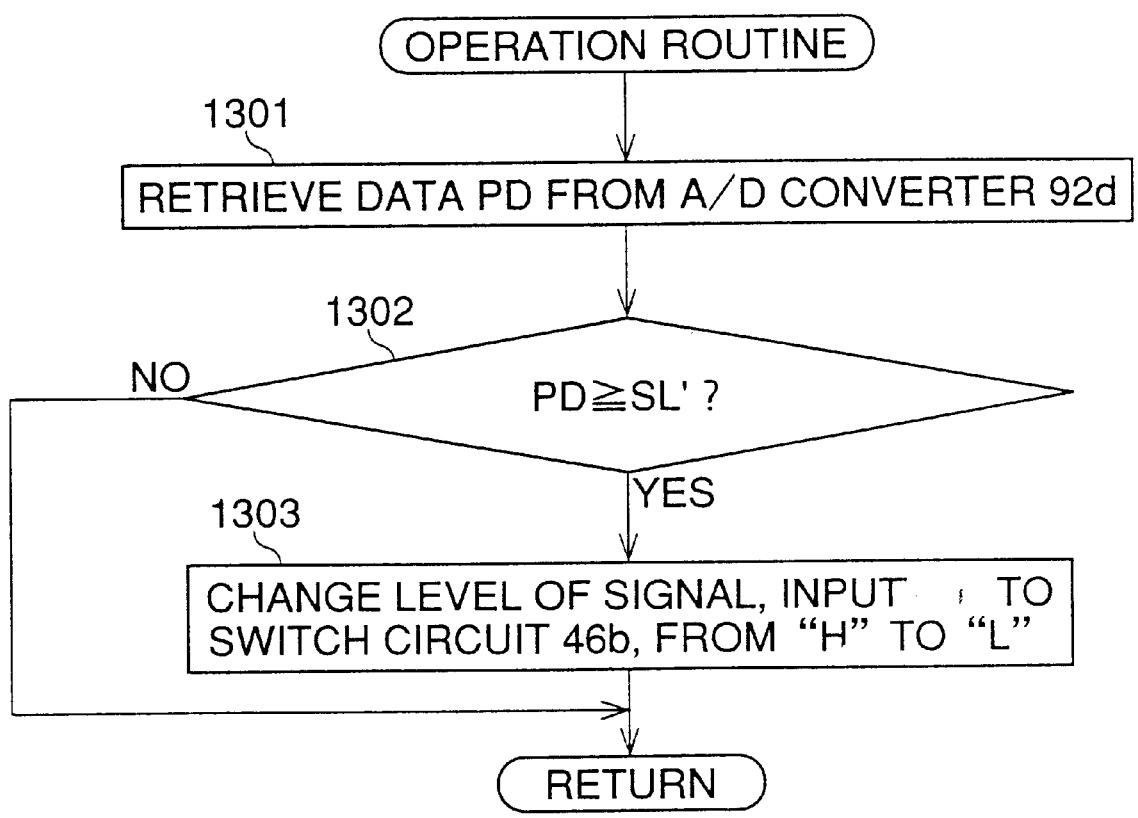
FIG. 13 is a flowchart showing an operation routine of the third embodiment of the controller according to the present invention.

FIG. 13 shows a flowchart for an operation routine of the third embodiment of the controller according to this invention. This operation routine is also a time interruption routine executed at time-intervals of, for example, 1 ms. Similar to the second embodiment, the execution of the operation routine is commenced when the transparency sensor 88 is electrically energized by the driver circuit 90. At this time, the switch circuit 46b has already been turned ON by changing the level of the signal output from the system control circuit 28 to the switch circuit 46b from the low level (L) to the high level (H). Thus, the voltage is applied from the voltage-generating circuit 46a to the medium RM through the switch circuit 46b.

At step 1301, differentiated data or transparency data PD is retrieved from the A/D converter 92d by the system control circuit 28. Then, at step 1302, the retrieved data PD is compared with the threshold level data (SL') previously stored in the ROM of the system control circuit 28. Namely, it is determined whether or not the data PD exceeds the threshold level data (SL'). If the retrieved data PD does not exceed the threshold level data (SL'), the routine is initially ended.

Thereafter, the routine is repeatedly executed at time-intervals of 1 ms. However, there is no progress as long as the retrieved data PD does not exceed the threshold level data (SL'). Namely, at step 1302, it is monitored whether or not the retrieved data PD exceeds the threshold level data (SL').

When it is confirmed that the retrieved data PD exceeds the threshold level data (SL'), the control proceeds from step 1302 to step 1303, in which the level of the signal output from the system control circuit 28 to the switch circuit 46b, is changed from the high level to the low level. Thus the switch circuit 46b is turned OFF so that the application of a voltage from the voltage-generating circuit 46a to the medium RM is stopped.

Figure 14:
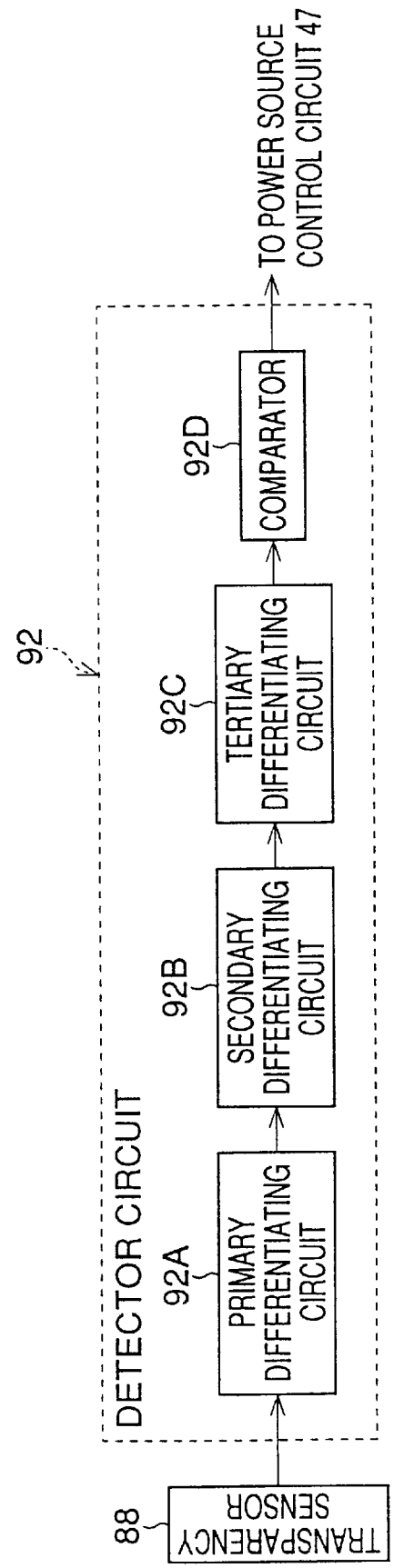
FIG. 14 is a block diagram of a fourth embodiment of the controller, according to the present invention, for controlling a stoppage-timing of the application of a voltage to the electro-developing recording medium.

FIG. 14 shows a block diagram of a fourth embodiment of the controller, according to the present invention, for controlling a stoppage-timing of the application of a voltage to the medium RM. In the fourth embodiment, the detector circuit 92 comprises a primary differentiating circuit 92A, a secondary differentiating circuit 92B, a tertiary differentiating circuit 92C and a comparator 92D.

Figure 15:
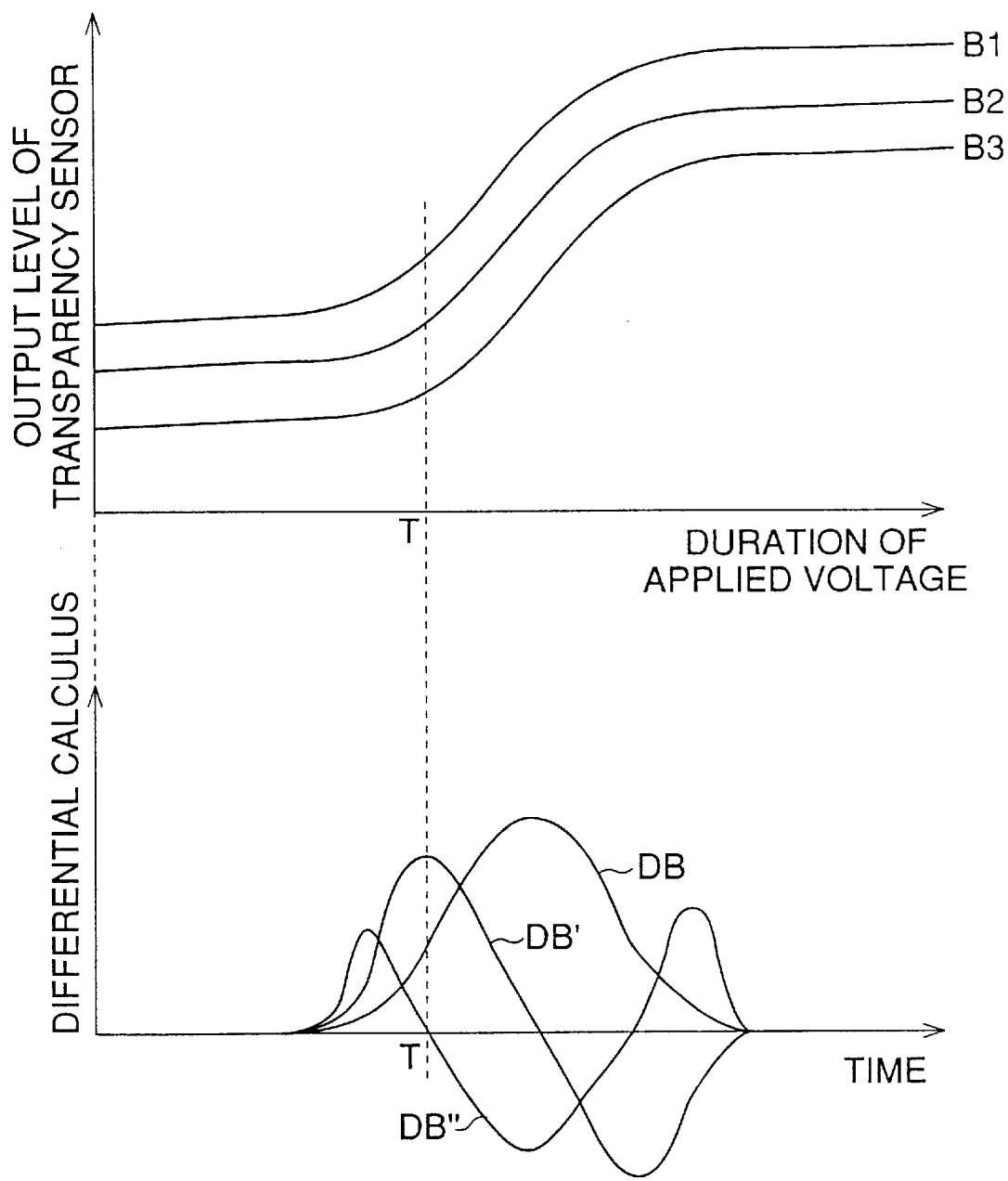
FIGS. 15A and 15B are graphs similar to that of FIGS. 6A and 6B are, showing the three curves of FIG. 5 together with a primary-differentiated curve, a secondary-differentiated curve and a tertiary-differentiated curve derived therefrom.

As shown in a graph of FIG. 15, which is similar to the graph of FIGS. 6A and 6B, when the output signal of the transparency sensor 88 is differentiated by the primary differentiating circuit 92A, the primary-differentiated signal is represented by the curve DB which is identical to that of FIGS. 6A and 6B. Also, when the primary-differentiated signal is differentiated by the secondary differentiating circuit 92B, the secondary-differentiated signal is represented by a curve DB'.

The time T substantially coincides with a first peak of the curve DB', as shown in FIG. 15. Accordingly, it is possible to properly determine the time T by detecting the first peak of the curve DB'. Preferably, for the detection of the first peak of the curve DB', the secondary-differentiated signal is further differentiated by the tertiary differentiating circuit 92C. In the graph of FIG. 15, the tertiary-differentiated signal is represented by a curve DB". The time T coincides with a location where the curve DB" intersects with the time axis. Namely, the time T coincides with a time when a value of the tertiary-differentiated signal becomes zero.

In the fourth embodiment, the zero value of the tertiary-differentiated signal is detected by the comparator 92D in which a zero level is set as a threshold level. An output terminal of the comparator 92D is connected to the reset-terminal R of the R-S flip-flop forming the power source control circuit 47. When a level of the tertiary-differentiated signal (DB") is greater than the threshold level (zero), a signal output from the comparator 92D is kept at a low level. When the level of the tertiary-differentiated signal (DB") reaches or is less than the threshold level (zero), the level of the output signal of the comparator 92D is changed from the low level to a high level. Thus, an operation of the fourth embodiment of the controller is executed in the same manner as the operation of the first embodiment as shown in FIG. 7. Namely, the application of a voltage to the medium RM is optimally stopped.

Figure 16:
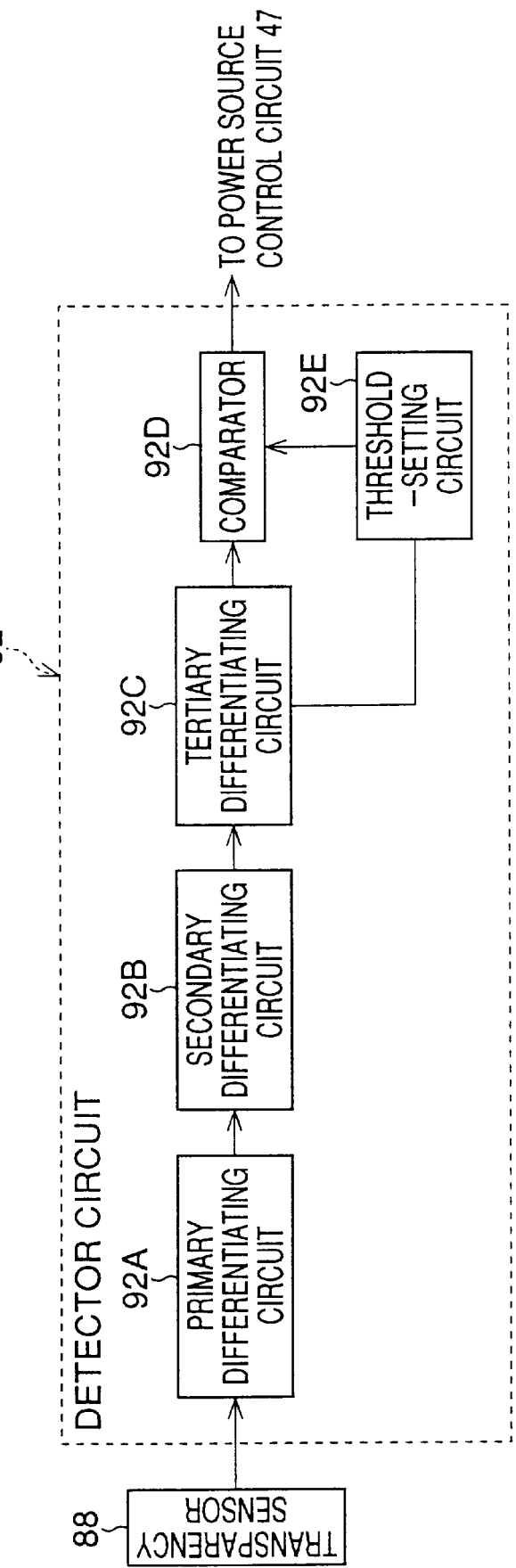
FIG. 16 is a block diagram of a fifth embodiment of the controller, according to the present invention, for controlling a stoppage-timing of the application of a voltage to the electro-developing recording medium.

FIG. 16 shows a block diagram of a fifth embodiment of the controller, according to the present invention, for controlling a stoppage-timing of the application of a voltage to the medium RM. Note, in this drawing, the features similar to those of FIG. 14 are indicated by the same references.

In the fifth embodiment, the detector circuit 92 further comprises a threshold-setting circuit 92E for adjusting the threshold level to be set in the comparator 92D. In actuality, there may be a discrepancy between the time T and the first peak of the secondary-differentiated curve DB'. If a degree of the discrepancy is large enough to affect the maximum or optimum contrast of a developed image of the medium RM, by adjusting the threshold level with the threshold-setting circuit 92E, it is possible to properly control the stoppage-timing of the application of a voltage to the medium RM.

Similar to the fourth embodiment as shown in FIG. 14, in the fifth embodiment an output terminal of the comparator 92D is connected to the reset-terminal R of the R-S flip-flop forming the power source control circuit 47. When a level of the tertiary-differentiated signal (DB") is greater than the set threshold level, a signal, output from the comparator 92D, is kept at a low level. When the level of the tertiary-differentiated signal (DB") reaches or is less than the set threshold level, the level of the output signal of the comparator 92D is changed from the low level to a high level. Thus, an operation of the fifth embodiment of the controller is also executed in the same manner as the operation of the first embodiment as shown in FIG. 7.

In the fourth and fifth embodiments, the power source control circuit 47 comprising the flip-flop may be omitted. In this case, similar to the second embodiment as shown in FIG. 10, the output terminal of the comparator 92D is connected to the system control circuit 28. Also, the switch circuit 46b of the power source circuit 46 is directly connected to the system control circuit 28. Of course, the operation is executed in substantially the same manner as in the flowchart of FIG. 11.

Further, in the fourth and fifth embodiments, the tertiary differentiating circuit 92D can be connected to the system control circuit 28 through the intermediary of an analog-to-digital convertor, similarly to the third embodiment as shown in FIG. 12. In this case, the operation is executed in substantially the same manner as in the flowchart of FIG. 13.

Figure 17:
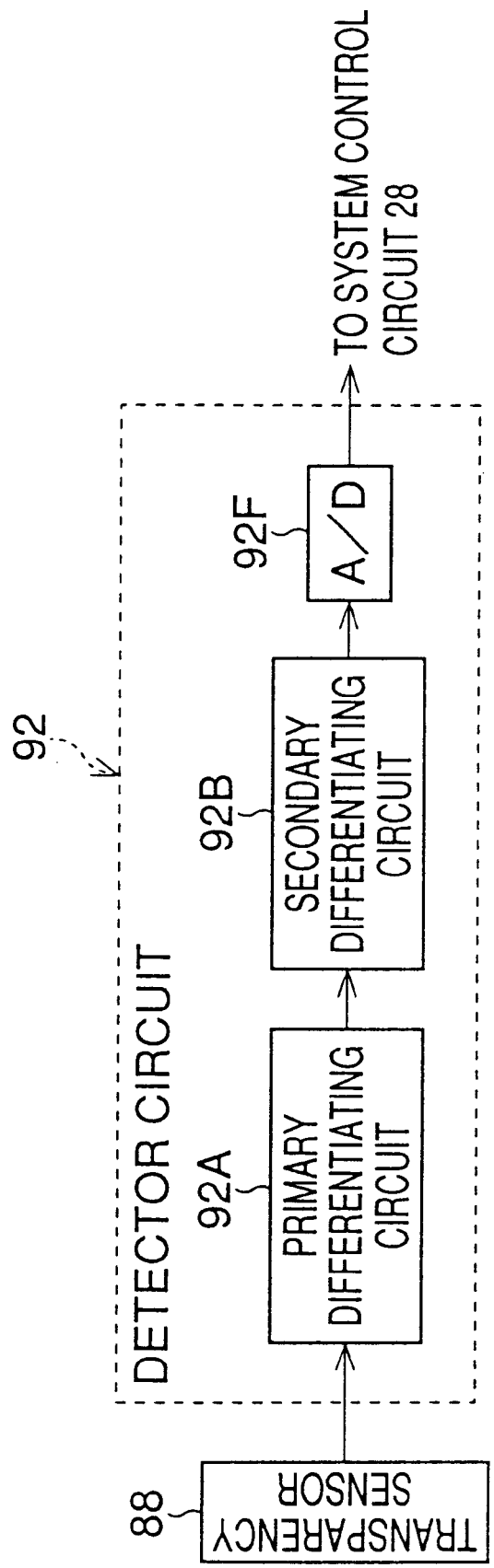
FIG. 17 is a block diagram of a sixth embodiment of the controller, according to the present invention, for controlling a stoppage-timing of the application of a voltage to the electro-developing recording medium.

FIG. 17 shows a block diagram of a sixth embodiment of the controller, according to the present invention, for controlling a stoppage-timing of the application of a voltage to the medium RM. Note, in this drawing, the features similar to those of FIG. 14 are indicated by the same references.

In the sixth embodiment, to determine the time point of T, the first peak of the secondary-differentiated curve DB' is directly detected (FIG. 15). To this end, the tertiary differentiating circuit 92C and the comparator 92D are omitted from the detector circuit 92, and an analog-to-digital (A/D) convertor 92F is connected to an output terminal of the secondary differentiating circuit 92B. Also, the power source control circuit 47 comprising the flip-flop is omitted, and an output terminal of the A/D convertor 92F is connected to the system control circuit 28. The switch circuit 46b of the power source circuit 46 is directly connected to the system control circuit 28.

Figure 18:
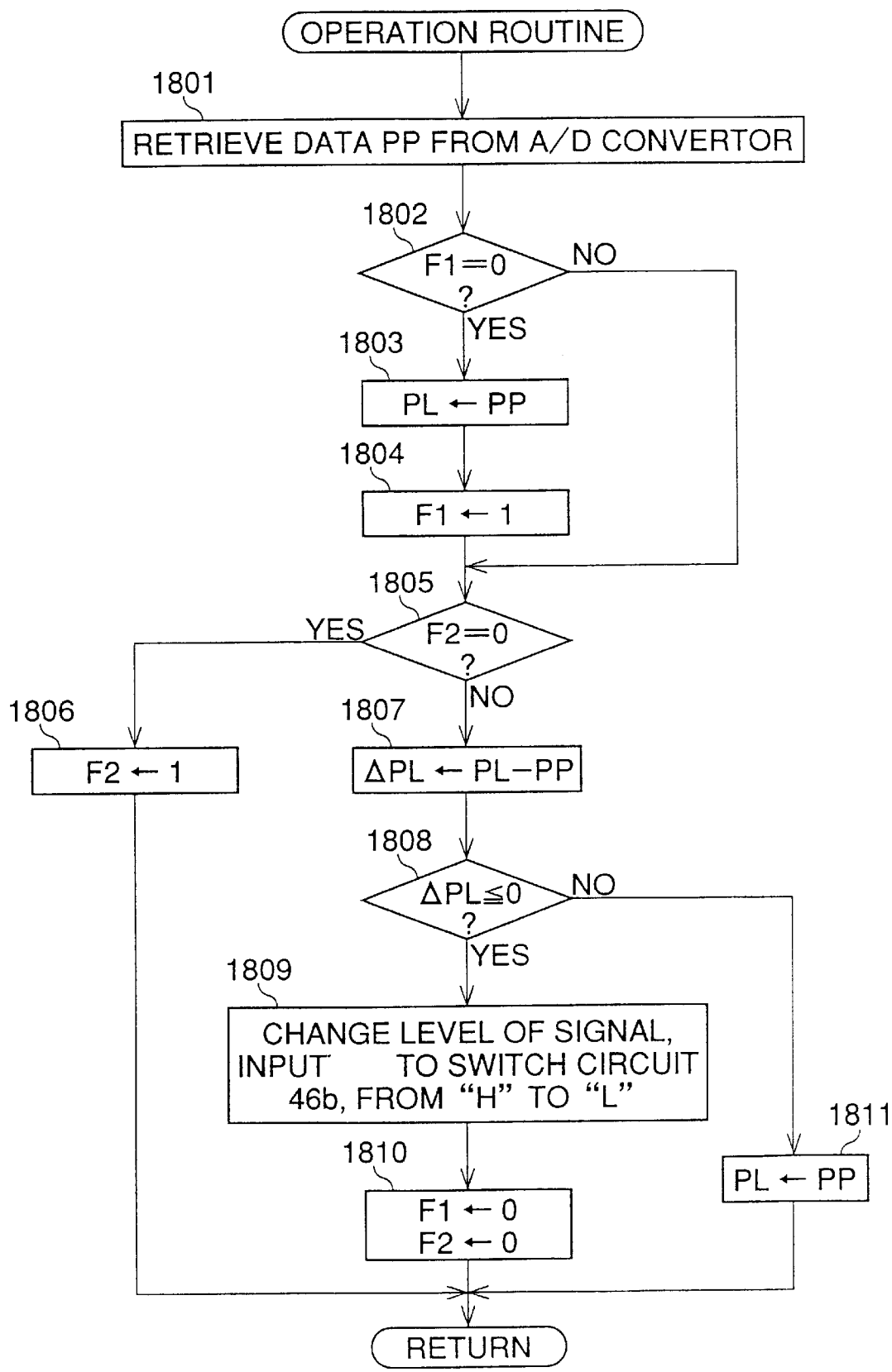
FIG. 18 is a flowchart showing an operation routine of the sixth embodiment of the controller according to the present invention.

FIG. 18 shows a flowchart for an operation routine of the sixth embodiment of the controller according to this invention. This operation routine is a time interruption routine executed at time-intervals of, for example, 1 ms. The execution of the operation routine may be commenced when the transparency sensor 88 is electrically energized by the driver circuit 90. At this time, the switch circuit 46b has already been turned ON by changing the level of the signal output from the system control circuit 28 to the switch circuit 46b, from the low level (L) to the high level (H), so that the voltage is applied from the voltage-generating circuit 46a to the medium RM through the switch circuit 46b.

At step 1801, secondary-differentiated data or transparency data PP is retrieved from the A/D convertor 92F by the system control circuit 28. Then, at step 1802, it is determined whether a flag F1 is "0" or "1". At the initial stage, since F1=0, the control proceeds to step 1803, in which the retrieved data PP is set to PL. Namely, the retrieved data PP is temporarily stored as data PL in the RAM of the system control circuit 28.

At step 1804, the flag F1 is set to "1". Then, at step 1805, it is determined whether or not a flag F2 is "0" or "1". At the initial stage, since F2=0, the control proceeds to step 1806, in which the flag F2 is set to "1". Thus, the routine is initially ended.

After a lapse of 1 ms, the routine is again executed. Namely, at step 1801, the retrieval of transparency data PP from the A/D convertor 92F is again carried out by the system control circuit 28. Then, at step 1802, it is determined whether the flag F1 is "0" or "1". At this stage, because F1=1, the control skips from step 1802 to step 1805, in which it is determined whether the flag F2 is "0" or "1". At this stage, because F2=1, the control proceeds from step 1805 to step 1807, in which the following calculation is carried out:

$$\Delta PL \leftarrow PL - PP$$

Namely, at step 1807, a difference between the preceding secondary-differentiated value (PL) and the recent secondary-differentiated value (PP) is calculated.

At step 1808, it is determined whether or not the resulted $\Delta PL$ is less than or equal to zero, i.e., it is determined whether or not the first peak of the secondary-differentiated curve DB' is detected. When $\Delta PL > 0$, i.e. when the first peak of the secondary-differentiated curve DB' is not detected, the control proceeds from step 1808 to step 1811, in which the data PL, stored in the RAM of the system control circuit 28, is renewed by the retrieved transparency data PP. Thus, the routine is again ended.

Thereafter, the routine is repeatedly executed at time-intervals of 1 ms in such a manner that the renewal of the data PL is successively carried out until, at step 1808, the resulting $\Delta PL$ is less than or equal to zero, i.e. the first peak of the secondary-differentiated curve DB' is detected. Namely, the peak of the secondary-differentiated curve DB' is detected in using a hill-climbing method.

At step 1808, when the detection of the first peak of the secondary-differentiated curve DB' is confirmed, the control proceeds from step 1808 to step 1809, in which the level of the signal output from the system control circuit 28 to the switch circuit 46b is changed from the high level to the low level. Thus, the switch circuit 46b is turned OFF so that the application of a voltage from the voltage-generating circuit 46a to the medium RM is optimally stopped. Then, at step 1810, both the flags 1 and 2 are set to "0". Thus, the operation routine is completed.

Finally, it will be understood by those skilled in the art that the foregoing description is of preferred embodiments of the disclosed controller, and that various changes and modifications may be made to the present invention without departing from the spirit and scope thereof.

The present disclosure relates to subject matter contained in japanese patent applications no. 8-269437 (filed on Sep. 19, 1996) and no. 9-81840 (filed on Mar. 14, 1997), which are expressly incorporated herein, by reference, in their entirety.

What is claimed is:

1. A controller for controlling a time of an application of a voltage to an electro-developing recording medium to develop an image with an optimum contrast, said controller comprising:

a power source for applying the voltage to said electro-developing recording medium;

a transparency sensor for detecting a transmittance of said electro-developing recording medium;

a differentiator for differentiating a value of the transmittance detected by said transparency sensor; and a determiner for determining the time of the application of the voltage to said electro-developing recording medium on the basis of the differentiated value obtained by said differentiator.

2. A controller as set forth in claim 1, wherein said differentiated value is a primary-differentiated value, and the determination of the time of the application of the voltage to said electro-developing recording medium is carried out by said determiner on the basis of a comparison of said primary-differentiated value with a predetermined threshold level.

3. A controller as set forth in claim 1, wherein said differentiated value is a secondary-differentiated value, and the determination of the time of the application of the voltage to said electro-developing recording medium is carried out by said determiner on the basis of a comparison of said secondary-differentiated value with a predetermined threshold level.

4. A controller as set forth in claim 1, wherein said differentiated value is a secondary-differentiated value, and the determination of the time of the application of the voltage to said electro-developing recording medium is carried out by said determiner on the basis of a detection of a first peak of said secondary-differentiated value.

5. A controller as set forth in claim 1, wherein said differentiated value is a tertiary-differentiated value, and the determination of the time of the application of the voltage to said electro-developing recording medium is carried out by said determiner on the basis of a comparison of said tertiary-differentiated value with a predetermined threshold level.

6. A controller as set forth in claim 1, wherein said transparency sensor detects a transmittance of a dark zone defined in said electro-developing recording medium.

7. A controller for controlling a termination time of an application of a voltage to an electro-developing recording medium to develop an image with an optimum contrast, said controller comprising:

a power source for applying the voltage to said electro-developing recording medium;

a transparency sensor for detecting a transmittance of said electro-developing recording medium;

a differentiator for differentiating a value of the transmittance detected by said transparency sensor;

a comparator for comparing the differentiated value obtained by said differentiator with a predetermined threshold level;

a determiner for determining whether said differentiated value is greater than or equal to said predetermined threshold level; and a stopper for stopping the application of the voltage to said electro-developing recording medium when said determiner determines that the differentiated value is greater than or equal to the predetermined threshold level.

8. A controller as set forth in claim 7, wherein said stopper comprises a switch circuit for switching said power source ON and OFF and said determiner comprises a flip-flop for controlling a switching operation of said switch circuit on the basis of a comparing-result from said comparator.

9. A controller as set forth in claim 7 wherein said stopper comprises a switch circuit for switching said power source ON and OFF and said determiner comprises a system for controlling a switching operation of said switch circuit on the basis of a comparing-result from said comparator.

10. A controller as set forth in claim 7, wherein said transparency sensor detects a transmittance of a dark zone defined in said electro-developing recording medium.

11. A controller for controlling a termination time of an application of a voltage to an electro-developing recording medium to develop an image with an optimum contrast, said controller comprising:

a power source for applying the voltage to said electro-developing recording medium;

a transparency sensor for detecting a transmittance of said electro-developing recording medium;

a primary differentiator for differentiating a value of the transmittance detected by said transparency sensor;

a secondary differentiator for differentiating the primary-differentiated value obtained by said primary differentiator;

a detector for detecting a first peak of the secondary differentiated value obtained by said secondary differentiator;

a determiner for determining whether the first peak of said secondary-differentiated value is detected by said detector; and a stopper for stopping the application of voltage to said electro-developing recording medium when said determiner determines the first peak of said secondary-differentiated value is detected.

12. A controller as set forth in claim 11, wherein said stopper comprises a switch circuit for switching said power source ON and OFF and said determiner comprises a system for controlling a switching operation of said switch circuit on the basis from a detecting-result of said detector.

13. A controller as set forth in claim 11, wherein said transparency sensor detects a transmittance of a dark zone defined in said electro-developing recording medium.

14. A controller for controlling a termination time of an application of a voltage to an electro-developing recording medium to develop an image with an optimum contrast, said controller comprising:

a power source for applying the voltage to said electro-developing recording medium;

a transparency sensor for detecting a transmittance of said electro-developing recording medium;

a primary differentiator for differentiating a value of the transmittance detected by said transparency sensor;

a secondary differentiator for differentiating the primary-differentiated value obtained by said primary differentiator;

a tertiary differentiator for differentiating the secondary-differentiated value obtained by said secondary differentiator;

a comparator for comparing the tertiary-differentiated value obtained by said tertiary differentiator with a predetermined threshold level;

a determiner for determining whether the tertiary-differentiated value is equal to or less than said predetermined threshold level; and a stopper for stopping the application of the voltage to said electro-developing recording medium when said determiner determines the differentiated value is equal to or less than the predetermined threshold level.

15. A controller as set forth in claim 14, wherein said stopper comprises a switch circuit for switching said power source ON and OFF and said determiner comprises a flip-flop for controlling a switching operation of said switch circuit on the basis from a comparing-result of said comparator.

16. A controller as set forth in claim 14, wherein said stopper comprises a switch circuit for switching said power source ON and OFF and said determiner comprises a program for controlling a switching operation of said switch circuit on the basis from a comparing-result of said comparator.

17. A controller as set forth in claim 14, wherein said transparency sensor detects a transmittance of a dark zone defined in said electro-developing recording medium.

18. A controller for controlling a time of an application of a voltage to an electro-developing recording medium to develop an image with an optimum contrast, said controller comprising:

power source means for applying the voltage to said electro-developing recording medium;

transparency sensor means for detecting a transmittance of said electro-developing recording medium;

differentiator means for differentiating a value of the transmittance detected by said transparency sensor means; and determiner means for determining the time of the application of the voltage to said electro-developing recording medium on the basis of the differentiated value obtained by said differentiator means.

19. A controller as set forth in claim 18, wherein said differentiated value is a primary-differentiated value, and the determination of the time of the application of the voltage to said electro-developing recording medium is carried out by said determiner means on the basis of a comparison of said primary-differentiated value with a predetermined threshold level.

20. A controller as set forth in claim 18, wherein said differentiated value is a secondary-differentiated value, and the determination of the time of the application of the voltage to said electro-developing recording medium is carried out by said determiner means on the basis of a comparison of said secondary-differentiated value with a predetermined threshold level.

21. A controller as set forth in claim 18, wherein said differentiated value is a secondary-differentiated value, and the determination of the time of the application of the voltage to said electro-developing recording medium is carried out by said determiner means on the basis of a detection of a first peak of said secondary-differentiated value.

22. A controller as set forth in claim 18, wherein said differentiated value is a tertiary-differentiated value, and the determination of the time of the application of the voltage to said electro-developing recording medium is carried out by said determiner means on the basis of a comparison of said tertiary-differentiated value with a predetermined threshold level.

23. A controller as set forth in claim 18, wherein said transparency sensor means detects a transmittance of a dark zone defined in said electro-developing recording medium.

24. A controller for controlling a termination time of an application of a voltage to an electro-developing recording medium to develop an image with an optimum contrast, said controller comprising:

power source means for applying the voltage to said electro-developing recording medium;

transparency sensor means for detecting a transmittance of said electro-developing recording medium;

differentiator means for differentiating a value of the transmittance detected by said transparency sensor means;

comparator means for comparing the differentiated value obtained by said differentiator means with a predetermined threshold level;

determiner means for determining whether the differentiated value is greater than or equal to said predetermined threshold level; and stopper means for stopping the application of the voltage to said electro-developing recording medium when said determiner means determines that the differentiated value is greater than or equal to the predetermined threshold level.

25. A controller as set forth in claim 24, wherein said stopper means comprises a switch circuit for switching said power source means ON and OFF and said determiner means comprises a flip-flop for controlling a switching operation of said switch circuit on the basis from a comparing-result of said comparator means.

26. A controller as set forth in claim 24, wherein said stopper means comprises a switch circuit for switching said power source means ON and OFF and said determiner means comprises a program for controlling a switching operation of said switch circuit on the basis from a comparing-result of said comparator means.

27. A controller as set forth in claim 24, wherein said transparency sensor means detects a transmittance of a dark zone defined in said electro-developing recording medium.

28. A controller for controlling a stoppage-timing of an application of a voltage to an electro-developing recording medium to develop an image with an optimum contrast, said controller comprising:

power source means for applying the voltage to said electro-developing recording medium;

transparency sensor means for detecting a transmittance of said electro-developing recording medium;

primary differentiator means for differentiating a value of the transmittance detected by said transparency sensor means;

secondary differentiator means for differentiating the primary-differentiated value obtained by said primary differentiator means;

a detector for detecting a first peak of the secondary differentiated value obtained by said secondary differentiator means;

determiner means for determining whether the first peak of said secondary-differentiated value is detected by said detector; and stopper means for stopping the application of the voltage to said electro-developing recording medium when said determiner means determines that the first peak of said secondary-differentiated value is detected.

29. A controller as set forth in claim 28, wherein said stopper means comprises a switch circuit for switching said power source means ON and OFF and said determiner means comprises a system for controlling a switching operation of said switch circuit on the basis of a detecting-result from said detector.

30. A controller as set forth in claim 28, wherein said transparency sensor detects a transmittance of a dark zone defined in said electro-developing recording medium.

31. A controller for controlling a stoppage-timing of an application of a voltage to an electro-developing recording medium to develop an image with an optimum contrast, said controller comprising:

power source means for applying the voltage to said electro-developing recording medium;

transparency sensor means for detecting a transmittance of said electro-developing recording medium;

primary differentiator means for differentiating a value of the transmittance detected by said transparency sensor means;

secondary differentiator means for differentiating the primary-differentiated value obtained by said primary differentiator means;

tertiary differentiator means for differentiating the secondary-differentiated value obtained by said secondary differentiator means;

comparator means for comparing the tertiary-differentiated value obtained by said tertiary differentiator means with a predetermined threshold level;

determiner means for determining whether the tertiary-differentiated value is equal to or less than said predetermined threshold level; and stopper means for stopping the application of the voltage to said electro-developing recording medium when said determiner means determines that the differentiated value is equal to or less than the predetermined threshold level.

32. A controller as set forth in claim 31, wherein said stopper means comprises a switch circuit for switching said power source means ON and OFF and said determiner means comprises a flip-flop for controlling a switching operation of said switch circuit on the basis of a comparing-result from said comparator means.

33. A controller as set forth in claim 31, wherein said stopper means comprises a switch circuit for switching said power source means ON and OFF and said determiner means comprises a system for controlling a switching operation of said switch circuit on the basis of a comparing-result from said comparator means.

34. A controller as set forth in claim 31, wherein said transparency sensor detects a transmittance of a dark zone defined in said electro-developing recording medium.

* * * * *